United States Patent
Hayashi

(10) Patent No.: US 12,308,723 B2
(45) Date of Patent: May 20, 2025

(54) LINEAR MOTOR

(71) Applicant: KOBE STEEL, LTD., Hyogo (JP)

(72) Inventor: Shumpei Hayashi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 260 days.

(21) Appl. No.: 18/001,559

(22) PCT Filed: May 25, 2021

(86) PCT No.: PCT/JP2021/019878
§ 371 (c)(1),
(2) Date: Dec. 12, 2022

(87) PCT Pub. No.: WO2021/256195
PCT Pub. Date: Dec. 23, 2021

(65) Prior Publication Data
US 2023/0231459 A1   Jul. 20, 2023

(30) Foreign Application Priority Data

Jun. 15, 2020 (JP) .................................. 2020-103401

(51) Int. Cl.
*H02K 41/03*   (2006.01)
(52) U.S. Cl.
CPC .................. *H02K 41/031* (2013.01)
(58) Field of Classification Search
CPC ....................... H02K 41/031; H02K 41/02
USPC ........................................................ 310/12.18
See application file for complete search history.

(56) References Cited

U.S. PATENT DOCUMENTS

| 2003/0234584 | A1* | 12/2003 | Miyata | ................. | H02K 41/031 |
| | | | | | 310/12.01 |
| 2006/0006743 | A1* | 1/2006 | Kawai | .................. | H02K 41/031 |
| | | | | | 310/12.22 |
| 2011/0248579 | A1* | 10/2011 | Aoyama | ............... | H02K 41/031 |
| | | | | | 310/12.25 |

(Continued)

FOREIGN PATENT DOCUMENTS

| JP | 2010-098929 A |   | 4/2010 |
| JP | 2019075848 A | * | 5/2019 |

OTHER PUBLICATIONS

Translation of JP2019075848A (Year: 2019).*

(Continued)

*Primary Examiner* — Terrance L Kenerly
*Assistant Examiner* — Theodore L Perkins
(74) *Attorney, Agent, or Firm* — Studebaker Brackett PLLC

(57) ABSTRACT

Provided is a linear motor capable of having enhanced thrust density. The linear motor includes a magnetic pole element and an armature including coils. The magnetic pole element includes magnetic pole element cores and permanent magnets. The magnetic element cores include first cores, second cores, third cores, and fourth cores, each aligned in the linear motion direction. The permanent magnets are interposed between mutually adjacent magnetic element cores among the magnetic element cores. The armature is divided into a first armature portion opposed to the first and third cores, a second armature portion opposed to the first and second cores, a third armature portion opposed to the third and fourth cores.

9 Claims, 13 Drawing Sheets

(56) References Cited

U.S. PATENT DOCUMENTS

2011/0278958 A1* 11/2011 Kawakami .......... H02K 41/031
   310/12.25
2014/0225459 A1   8/2014 Kawakami

OTHER PUBLICATIONS

Hayashi, Shumpei et al.; "Improvement of Electric Motor Thrust by Three-Dimensional Magnetic Pole Structure"; Journal D of the Institute of Electric Society; 2019; pp. 645-651; vol. 139 No. 7; with partial English translation.

The extended European search report issued by the European Patent Office on Sep. 29, 2023, which corresponds to European Patent Application No. 21824920.9-1202 and is related to U.S. Appl. No. 18/001,559.

* cited by examiner

FIG.6
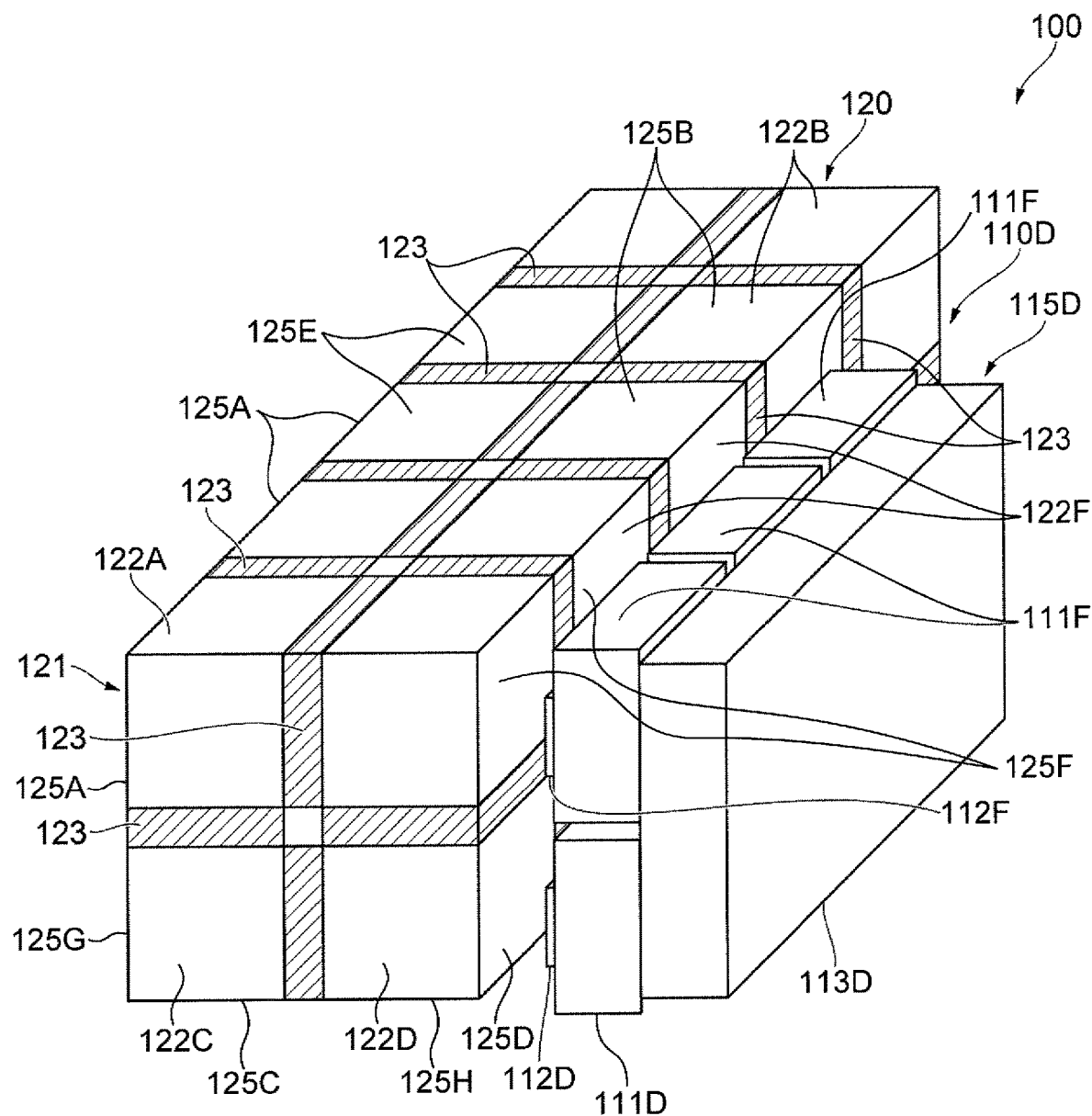
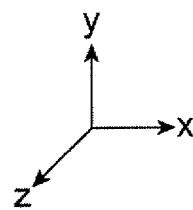

LINEAR MOTOR

TECHNICAL FIELD

The present invention relates to a linear motor including a magnetic pole element and an armature.

BACKGROUND ART

There is conventionally known a linear motor including a magnetic pole element and an armature. The armature generates a magnetic field for moving the magnetic pole element in a predetermined linear motion direction relatively to the armature. For example, the linear motor disclosed in the following Non-Patent Literature 1 has periodicity in both a movable axis direction that is the linear motion direction and a circumference direction orthogonal to the movable axis direction, and has a tubular shape that is long in the linear motion direction, namely, z-axis direction. The magnetic pole of the linear motor is mainly composed of a plurality of center cores which are bulk cores having isotropic magnetic properties. Each of the center cores has five surfaces other than a surface opposed to the armature, a plurality of permanent magnets being arranged on each of the five surfaces; the magnetization direction of each of the permanent magnets is set so as to be perpendicular to the surface of the center core with which the permanent magnet makes contact.

The enhancement of thrust that can be generated per volume or mass of the linear motor as described above, namely, thrust density, requires the enhancement of the thrust that can be generated by the linear motor and the reduction in surplus space or dense configuration. For the enhancement of the thrust density, therefore, it is important to reduce leakage magnetic flux in the teeth of the armature core.

CITATION LIST

Patent Literature

Non-Patent Literature 1: "Improvement of Electric Motor Thrust by Three-Dimensional Magnetic Pole Structure", Journal D of the institute of Electric Society, Vol. 139 No. 7 pp. 645-651

SUMMARY OF INVENTION

It is an object of the present invention to provide a linear motor capable of having enhanced thrust density.

The inventors have focused on the fact that a leakage magnetic flux is generated between coils aligned in a linear motion direction in an armature to hinder the thrust density from being enhanced while the leakage magnetic flux is reduced by the decrease in the axial opposition area in which the coils are axially opposed to each other. The inventors have thereby arrived at dividing the armature enclosing the magnetic pole into a plurality of armature portions and efficiently opposing respective coil cores of the thus divided armature portions to the magnetic pole element in order to reduce the opposition area while securing the effective magnetic flux by the coil.

Provided is a linear motor including a magnetic pole element and an armature. The armature generates a magnetic field that moves the magnetic pole element in a linear motion direction relatively to the armature. The armature generates a magnetic field that moves the magnetic pole element in a linear motion direction relatively to the armature. The magnetic pole element includes a plurality of cores, each of which is formed of a magnetic material and has a plurality of magnetic pole surfaces opposable to the armature, and a plurality of permanent magnets interposed between adjacent cores that are adjacent to each other among the plurality of cores. The plurality of cores include a plurality of first cores aligned in the linear motion direction, a plurality of second cores aligned in the linear motion direction, a plurality of third cores aligned in the linear motion direction, and a plurality of fourth cores aligned in the linear motion direction. The first cores are adjacent to the second cores, respectively, in a first alignment direction orthogonal to the linear motion direction and adjacent to the third cores, respectively, in a second alignment direction orthogonal to each of the linear motion direction and the first alignment direction. The fourth cores are adjacent to the second cores, respectively, in the second alignment direction and adjacent to the third cores, respectively, in the first alignment direction. The plurality of magnetic pole surfaces of each of the first cores include a first magnetic pole surface facing a side opposite to the plurality of second cores in the first alignment direction and a fifth magnetic pole surface facing a side opposite to the plurality of third cores in the second alignment direction. The plurality of magnetic pole surfaces of each of the second cores include a second magnetic pole surface facing a side opposite to the plurality of fourth cores in the second alignment direction and a sixth magnetic pole surface facing a side opposite to the plurality of first cores in the first alignment direction. The plurality of magnetic pole surfaces of each of the third cores include a third magnetic pole surface facing a side opposite to the plurality of first cores in the second alignment direction and a seventh magnetic pole surface facing a side opposite to the plurality of fourth cores in the first alignment direction. The plurality of magnetic pole surfaces of each of the fourth cores include a fourth magnetic pole surface facing a side opposite to the plurality of third cores in the first alignment direction and an eighth magnetic pole surface facing a side opposite to the plurality of second cores in the second alignment direction. The plurality of permanent magnets are interposed between adjacent cores that are adjacent to each other among the plurality of cores, respectively. Each of the permanent magnets has a first magnet surface opposed to one of the adjacent cores and a second magnet surface facing a side opposite to the first magnet surface, the first magnet surface and the second magnet surface forming mutually opposite magnetic poles. The plurality of permanent magnets are arranged such that the magnetic pole surfaces that are adjacent to each other and included in a magnetic pole surface group constituted by the plurality of magnetic pole surfaces of the plurality of cores form mutually opposite magnetic poles. The armature is divided into a plurality of armature portions spaced in a direction orthogonal to the linear motion direction, and the plurality of armature portions include a first armature portion, a second armature portion, and a third armature portion. The first armature portion includes: a plurality of first coil cores aligned in the linear motion direction so as to be opposable to the first magnetic pole surface of each of the first cores in the first alignment direction, each of the first coil cores being formed of a magnetic material; a plurality of seventh coil cores aligned in the linear motion direction so as to be opposable to the seventh magnetic pole surface of each of the third cores in the first alignment direction, each of the seventh coil cores being formed of a magnetic material; a plurality of first coils disposed around the plurality of first coil cores, respectively, to form a magnetic flux flowing between each of the first coil cores and the first magnetic pole surface; a plurality of seventh coils disposed around the plurality of seventh coil cores, respectively, to form a magnetic flux flowing between each of the seventh coil cores and the seventh magnetic pole surface; and a first back yoke formed of a magnetic material and interconnecting the plurality of first coil cores and the plurality of seventh coil cores so as to allow a magnetic flux to flow between the plurality of first coil cores and the plurality of seventh coil cores. The second armature portion includes: a plurality of second coil cores aligned in the linear motion direction so as to be opposable to the second magnetic pole surface of each of the second cores in the second alignment direction, each of the second coil cores being formed of a magnetic material; a plurality of fifth coil cores aligned in the linear motion direction so as to be opposable to the fifth magnetic pole surface of each of the first cores in the second alignment direction, each of the fifth coil cores being formed of a magnetic material; a plurality of second coils disposed around the plurality of second coil cores, respectively, to form a magnetic flux flowing between each of the second coil cores and the second magnetic pole surface; a plurality of fifth coils disposed around the plurality of fifth coil cores, respectively, to form a magnetic flux flowing between each of the fifth coil cores and the fifth magnetic pole surface; and a second back yoke formed of a magnetic material and interconnecting the plurality of second coil cores and the plurality of fifth coil cores so as to allow a magnetic flux to flow between the plurality of second coil cores and the plurality of fifth coil cores. The third armature portion includes: a plurality of third coil cores aligned in the linear motion direction so as to be opposable to the third magnetic pole surface of each of the third cores in the second alignment direction, each of the third coil cores being formed of a magnetic material; a plurality of eighth coil cores aligned in the linear motion direction so as to be opposable to the eighth magnetic pole surface of each of the fourth cores in the second alignment direction, each of the eighth coil cores being formed of a magnetic material; a plurality of third coils disposed around the plurality of third coil cores, respectively, to form a magnetic flux flowing between each of the third coil cores and the third magnetic pole surface; a plurality of eighth coils disposed around the plurality of eighth coil cores, respectively, to form a magnetic flux flowing between each of the eighth coil cores and the eighth magnetic pole surface; and a third back yoke formed of a magnetic material and interconnecting the plurality of third coil cores and the plurality of eighth coil cores to each other so as to allow a magnetic flux to flow between the plurality of third coil cores and the plurality of eighth coil cores.

BRIEF DESCRIPTION OF DRAWINGS

FIG. 6 is a perspective view showing a part of the linear motor according to the first embodiment.

DESCRIPTION OF EMBODIMENTS

Below will be described embodiments of the present invention in detail with reference to the accompanying drawings.

Figure 1:
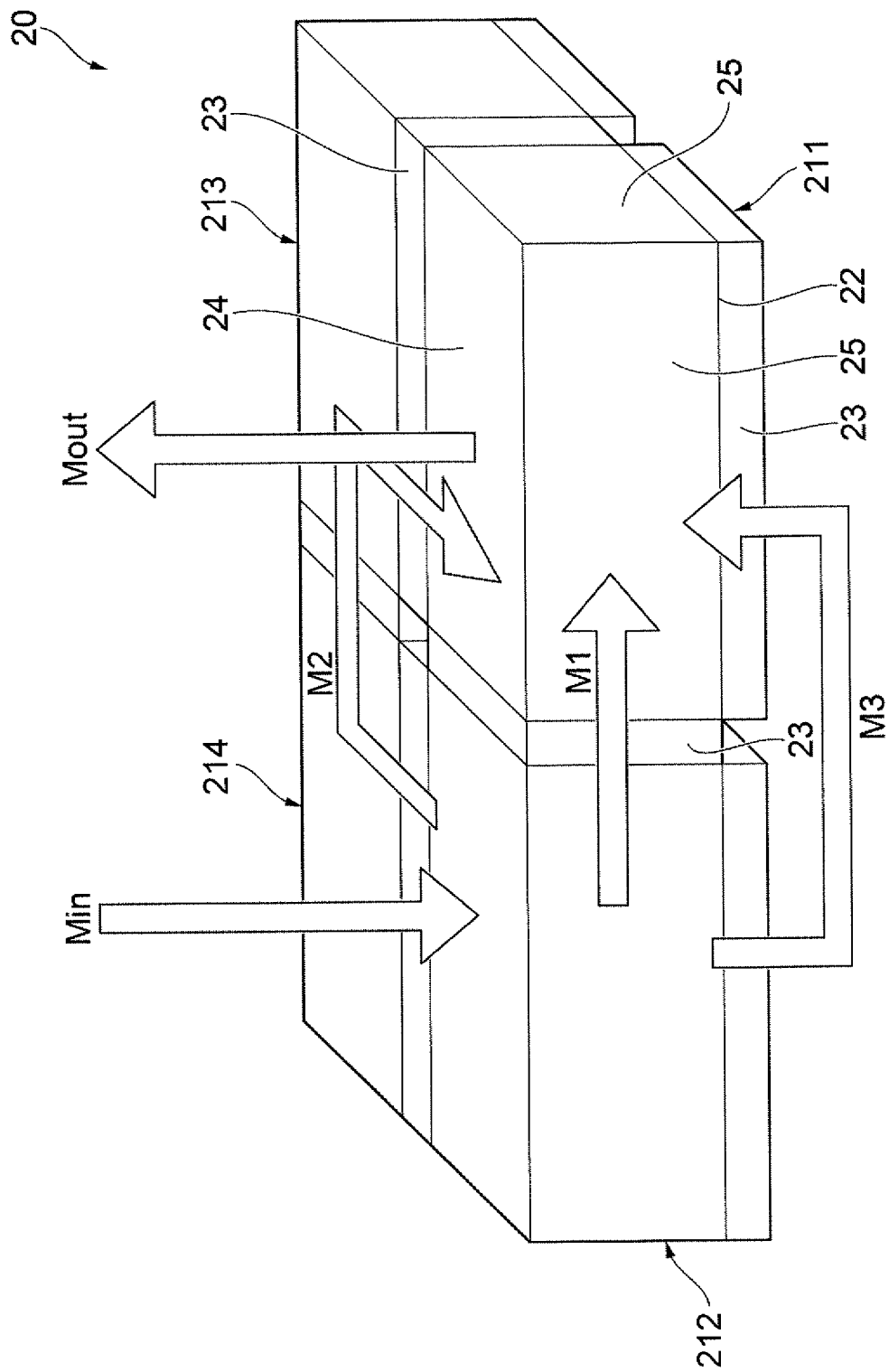
FIG. 1 is a perspective view showing a unit cell which is the smallest unit of a magnetic pole element according to an embodiment of the present invention.

FIG. 1 is a perspective view showing a unit cell 20 which is the smallest unit of a magnetic pole element in an electric motor according to each of the embodiments of the present invention. The unit cell 20 has a three-dimensional magnetic pole structure. The magnetic pole element is composed of a plurality of unit cells, each of which corresponds to the above unit cell 20. The electric motor includes the magnetic pole element and an armature, which is opposed to the magnetic pole element with a gap.

The unit cell 20 shown in FIG. 1 includes a plurality of magnetic pole blocks arranged along a predetermined arrangement plane, namely, a first magnetic pole block 211, a second magnetic pole block 212, a third magnetic pole block 213, and a fourth magnetic pole block 214. The first magnetic pole block 211 is adjacent to the second magnetic pole block 212 and the third magnetic pole block 213 in respective two directions orthogonal to each other on the arrangement plane, and the fourth magnetic pole block 214 is adjacent to the second magnetic pole block 212 and the third magnetic pole block 213 in the two directions, respectively.

Each of the first to fourth magnetic pole blocks 211 to 214 includes a magnetic pole element core 22 and a plurality of permanent magnets 23. The magnetic pole element core 22 is a soft magnetic material having a rectangular parallelepiped shape. Each of the permanent magnets 23 has a plate shape including a first magnet surface and a second magnet surface opposed to the first magnet surface. The first magnet surface corresponds to a main surface opposite to an outer surface on which each of the permanent magnets 23 is disposed, out of a plurality of outer surfaces of the magnetic pole element core 22, having a size equal to or larger than that of the outer surface. Each of the permanent magnets 23 is attached to the magnetic pole element core 22 so as to completely cover the outer surface of the magnetic pole element core 22. The plurality of outer surfaces of the magnetic pole element core 22 having the rectangular parallelepiped shape include six outer surfaces, and three of the permanent magnets 23 are attached on three outer surfaces out of the six outer surfaces, respectively. The other three outer surfaces of the six outer surfaces of the magnetic pole element core 22 are a plurality of open outer surfaces that are opened with no attachment of the permanent magnet 23 thereon.

One surface of the three open outer surfaces of the magnetic pole element core 22 serves as a magnetic-pole-element magnetic pole surface 24 that is opposed to the armature with a gap therebetween when the armature is disposed on the upper side of the unit cell 20 in FIG. 1. Each of the other two open outer surfaces of the three open outer surfaces serves as a magnetic-pole-element magnetic pole surface 25 that is opposed to the armature with a gap therebetween when the armature is disposed on the nearer side or the right side in the drawing. The magnetic pole of each of the magnetic-pole-element magnetic pole surfaces 24 and 25 is the same as the magnetic pole of the first magnet surface facing the magnetic pole element core 22 out of the plurality of permanent magnets 23. The surface facing the outside of each of the permanent magnets 23, that is, the second magnet surface facing the opposite side to the magnetic pole element core 22, has a magnetic pole opposite to the magnetic pole of each of the magnetic-pole-element magnetic pole surfaces 24 and 25.

In the unit cell 20 shown in FIG. 1, two adjacent magnetic pole blocks that are adjacent to each other among the plurality of magnetic pole blocks share the permanent magnet 23 that is interposed between respective magnetic pole element cores of the two magnetic pole blocks. For example, the permanent magnets 23 interposed between the magnetic pole element core 22 of the first magnetic pole block 211 and the blocks of the second magnetic pole block 212 and the third magnetic pole block 213, respectively, cover the outer surface of the magnetic pole element core 22 in the first magnetic pole block 211 and further cover the outer surface of the magnetic pole element core 22 in the magnetic pole block 212 and the outer surface of the magnetic pole element core 22 in the third magnetic pole block 213, respectively. Similarly, the permanent magnets 23 interposed between the magnetic pole element core 22 of the fourth magnetic pole block 214 and respective magnetic pole element cores 22 of the second magnetic pole block 212 and the third magnetic pole block 213, respectively, cover the outer surface of the magnetic pole element core 22 in the first magnetic pole block 214 and further cover the outer surface of the magnetic pole element core 22 in the magnetic pole block 212 and the outer surface of the magnetic pole element core 22 in the third magnetic pole block 213, respectively.

In contrast, it is also possible that the two adjacent magnetic pole blocks contain their respective permanent magnets 23 independent of each other. Specifically, it is also possible that the first magnetic pole block 211 includes permanent magnets 23 facing the second magnetic pole block 212 and the third magnetic pole block 213, respectively, while each of the second magnetic pole block 212 and the third magnetic pole block 213 includes a permanent magnet 23 facing the first magnetic pole block 211, separately from the permanent magnet 23 of the first magnetic pole block 211. Similarly, it is also possible that the fourth magnetic pole block 214 includes permanent magnets 23 facing the second magnetic pole block 212 and the third magnetic pole block 213, respectively, while each of the second magnetic pole block 212 and the third magnetic pole block 213 includes a permanent magnet 23 facing the fourth magnetic pole block 214, separately from the permanent magnet 23 of the fourth magnetic pole block 214. In other words, there may be interposed a pair of permanent magnets 23 between respective magnetic pole element cores 22 of adjacent magnetic pole blocks that are adjacent to each other among the first to fourth magnetic pole blocks 211 to 214, the pair of permanent magnets 23 belonging to the adjacent magnetic pole blocks, respectively.

The unit cell 20 generates a plurality of magnetic paths in each of the adjacent magnetic pole blocks that are adjacent to each other among the first to fourth magnetic pole blocks 211 to 214. For example, as a magnetic path that enters the second magnetic pole block 212 as indicated by an arrow Min in FIG. 1 and comes out of the first magnetic pole block 211 as indicated by an arrow Mout, generated are the following magnetic paths, namely, a first magnetic path, a second magnetic path, and a third magnetic path. As indicated by an arrow M1 in FIG. 1, the first magnetic path enters the first magnetic pole block 211 from the second magnetic pole block 212 through the permanent magnet 23 between the magnetic pole element core 22 of the first magnetic pole block 211 and the magnetic pole element core 22 of the second magnetic pole block 212. As indicated by an arrow M2 in FIG. 1, the second magnetic path enters the fourth magnetic pole block 214 from the second magnetic pole block 212 through the permanent magnet 23 between the magnetic pole element core 22 of the second magnetic pole block 212 and the magnetic pole element core 22 of the fourth magnetic pole block 214, enters the third magnetic pole block 213 from the fourth magnetic pole block 214 through the permanent magnet 23 between the magnetic pole element core 22 of the third magnetic pole block 213 and the magnetic pole element core 22 of the fourth magnetic pole block 214, and enters the first magnetic pole block 211 from the third magnetic pole block 213 through the permanent magnet 23 between the magnetic pole element core 22 of the magnetic pole block 211 and the magnetic pole element core 22 of the third magnetic pole block 213. As indicated by an arrow M3 in FIG. 1, the third magnetic path comes out of the second magnetic pole block 212 through the permanent magnet 23 on the lower side of the magnetic pole element core 22 in the second magnetic pole block 212 and enters the first magnetic pole block 211 through the permanent magnet 23 on the lower side of the magnetic pole element core 22 in the first magnetic pole block 211.

The unit cell 20, in which a plurality of magnetic paths are thus present, allows the permanent magnets 23 to have respective large effective area through which the magnetic flux passes. The effective area is an area of a region where the first magnet surface and the second magnet surface overlap each other as viewed in the normal direction (that is, the thickness direction) of the first magnet surface and the second magnet surface: in the case where the permanent magnet 23 is a rectangular parallelepiped, the effective area is equivalent to the area of each of the first and second magnet surfaces.

In the unit cell 20, the effective area of each of the permanent magnets 23 is small, which allows a large magnetic resistance to be secured even if each permanent magnet 23 has a small thickness. This makes it possible to render the demagnetizing field in the unit cell 20 small.

The magnitude of the magnetic flux that is output from the plurality of permanent magnets 23 to the outside is proportional to the sum of the effective areas of the permanent magnets 23 through which the magnetic flux passes, while being inversely proportional to the magnitude of the demagnetizing field generated in each of the permanent magnets 23. In the unit cell 20 having the three-dimensional magnetic pole structure as shown in FIG. 1, therefore, the plurality of permanent magnets 23 can output a large magnetic flux to the outside.

The purpose of the three-dimensional magnetic pole structure of the unit cell 20 is, thus, to increase the energy of the magnetic field in the gap. For example, in the case of application of a magnetic field generation device including the unit cells 20 to an electric motor, increasing the energy amount of a magnetic field generated in a gap, where the magnetic field is likely to interact with a current input from the outside, allows a large electromagnetic force to be obtained with a small current. That is because the Joule loss is reduced although the required voltage is increased.

Figure 2:
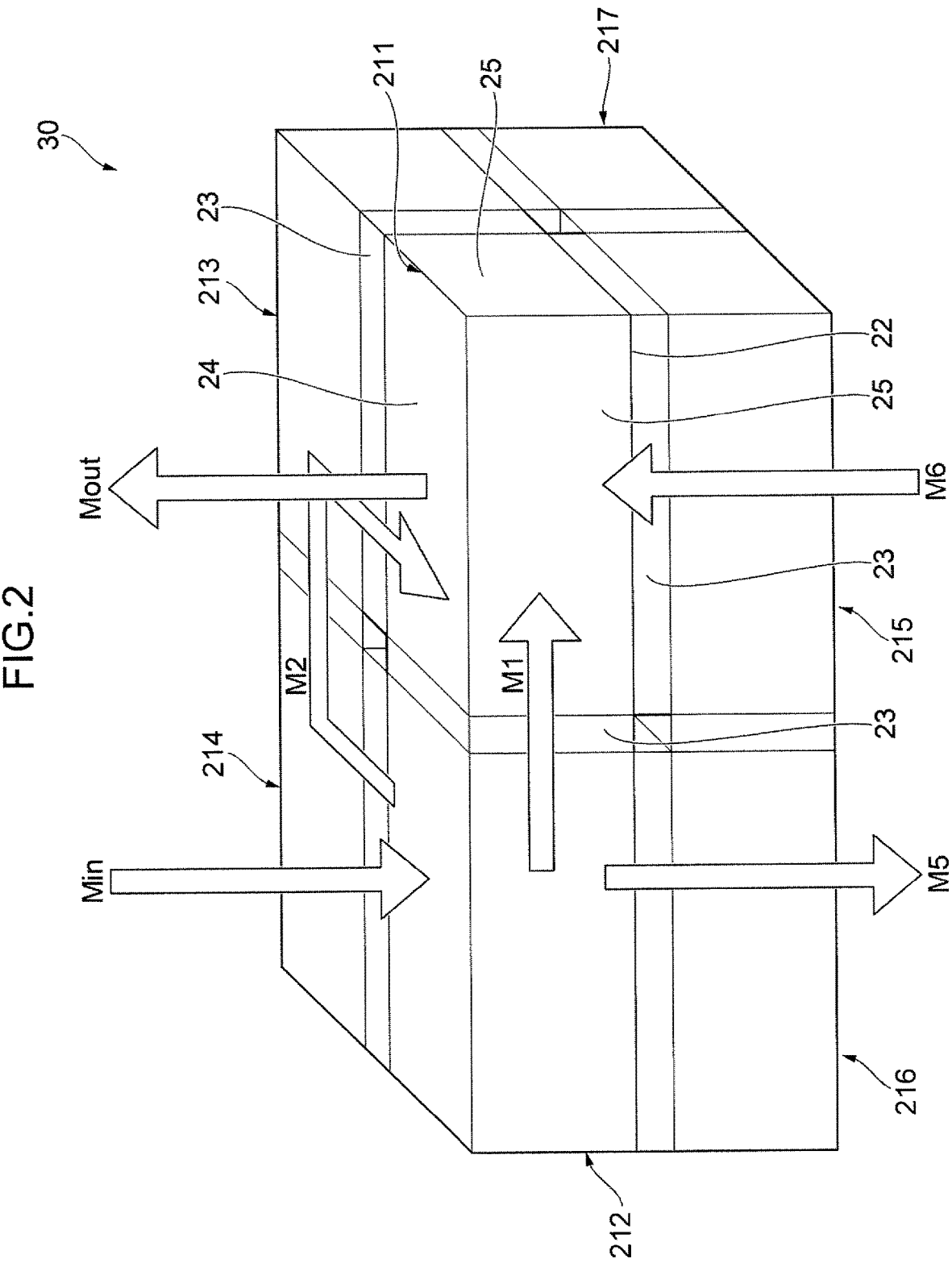
FIG. 2 is a perspective view showing a unit cell different from the unit cell shown in FIG. 1.

FIG. 2 shows a unit cell 30 that is enlarged from the unit cell 20. The unit cell 30 has a three-dimensional magnetic pole structure like the unit cell 20, but has three pairs of opposition surfaces facing opposite sides, and each of the three pairs of opposition surfaces is opposable to the armature.

The unit cell 30 includes first to fourth magnetic pole blocks 211 to 214 arranged along a predetermined first arrangement plane in the same manner as the first to fourth magnetic pole blocks 211 to 214 in the unit cell 20. The first magnetic pole block 211 is adjacent to the second magnetic pole block 212 and the third magnetic pole block 213, and the fourth magnetic pole block 214 is adjacent to the second magnetic pole block 212 and the third magnetic pole block 213.

In addition to the first to fourth magnetic pole blocks 211 to 214, the unit cell 30 further includes a fifth magnetic pole block 215, a sixth magnetic pole block 216, a seventh magnetic pole block 217, and an eighth magnetic pole block not shown in FIG. 2, which blocks are arranged along a second arrangement plane parallel to the first arrangement plane. In the second arrangement plane, the fifth magnetic pole block 215 is adjacent to the sixth magnetic pole block 216 and the seventh magnetic pole block 217 in respective two directions orthogonal to each other, and the eighth magnetic pole block 218 is adjacent to the sixth magnetic pole block 216 and the seventh magnetic pole block 217 in the two directions, respectively.

Moreover, with respect to the direction in which the first and second arrangement planes are arranged, namely, the up-down direction in FIG. 2, the first magnetic pole block 211 is adjacent to the fifth magnetic pole block 215, the second magnetic pole block 212 is adjacent to the sixth magnetic pole block 216, the third magnetic pole block 213 is adjacent to the seventh magnetic pole block 217, and the fourth magnetic pole block 214 is adjacent to the eighth magnetic pole block.

The configuration of each of the first to seventh magnetic pole blocks 211 to 217 and the eighth magnetic pole block is the same as the configuration of each of the first to fourth magnetic pole blocks 211 to 214 in the unit cell 20; hence, the same components are denoted by the same reference numerals, and the description thereof will be omitted.

The configuration of each of the first to eighth magnetic pole blocks 211 to 218 is the same as the configuration of each of the first to fourth magnetic pole blocks 211 to 214 in the unit cell 20; hence, the same components are denoted by the same reference numerals, and the description thereof will be omitted.

The unit cell 30 also generates a plurality of magnetic paths in each of the adjacent magnetic pole blocks that are adjacent to each other among the first to fourth magnetic pole blocks 211 to 214. For example, as a magnetic path that enters the second magnetic pole block 212 as indicated by an arrow Min in FIG. 2 and comes out of the first magnetic pole block 211 as indicated by an arrow Mout, generated are the following magnetic paths, namely, a first magnetic path, a second magnetic path, and a third magnetic path. As indicated by an arrow M1 in FIG. 2, the first magnetic path enters the first magnetic pole block 211 from the second magnetic pole block 212 through the permanent magnet 23 between the magnetic pole element core 22 of the first magnetic pole block 211 and the magnetic pole element core 22 of the second magnetic pole block 212. As indicated by an arrow M2 in FIG. 2, the second magnetic path enters the fourth magnetic pole block 214 from the second magnetic pole block 212 through the permanent magnet 23 between the magnetic pole element core 22 of the second magnetic pole block 212 and the magnetic pole element core 22 of the fourth magnetic pole block 214, enters the third magnetic pole block 213 from the fourth magnetic pole block 214 through the permanent magnet 23 between the magnetic pole element core 22 of the third magnetic pole block 213 and the magnetic pole element core 22 of the fourth magnetic pole block 214, and enters the first magnetic pole block 211 from the third magnetic pole block 213 through the permanent magnet 23 between the magnetic pole element core 22 of the first magnetic pole block 211 and the magnetic pole element core 22 of the third magnetic pole block 213. As indicated by an arrow M5 in FIG. 2, the third magnetic path enters the sixth magnetic pole block 216 through the permanent magnet 23 on the lower side of the magnetic pole element core 22 in the second magnetic pole block 212, comes out of the sixth magnetic pole block 216 and enters the fifth magnetic pole block 215 as indicated by an arrow M6 in FIG. 2, and enters the first magnetic pole block 211 through the permanent magnet 23 on the lower side of the magnetic pole element core 22 in the first magnetic pole block 211.

The three-dimensional magnetic pole structure according to the unit cell 30 is also applicable to a rotor of an electric motor different from the linear motor according to the present invention, for example, a double-gap motor described in Japanese Unexamined Patent Application Publication No. 2010-98929. For example, it is preferable that the unit cell 30 is formed in a fan-shaped columnar shape lacking a radially inner part, and incorporated into the rotor, for example, so as to orient an upper part of the unit cell 30 shown in FIG. 2 to one axial side of the rotor and so as to orient a lower part of the unit cell 30 shown in FIG. 2 to the other axial side.

The driving force (output) of the electric motor, that is, the force for moving the magnetic pole element relatively to the armature, is generally provided by the interaction due to the interlinkage of the magnetic flux generated by the magnetic pole element with the current loop formed in the armature, in other words, the interaction between the magnetic flux by the magnetic pole element and the magnetic field generated by the current loop. At this time, most of the magnetic flux in the armature passes through the armature core having a high magnetic permeability, while there exists a so-called leakage magnetic flux that passes through a space outside the armature core.

Figure 3:
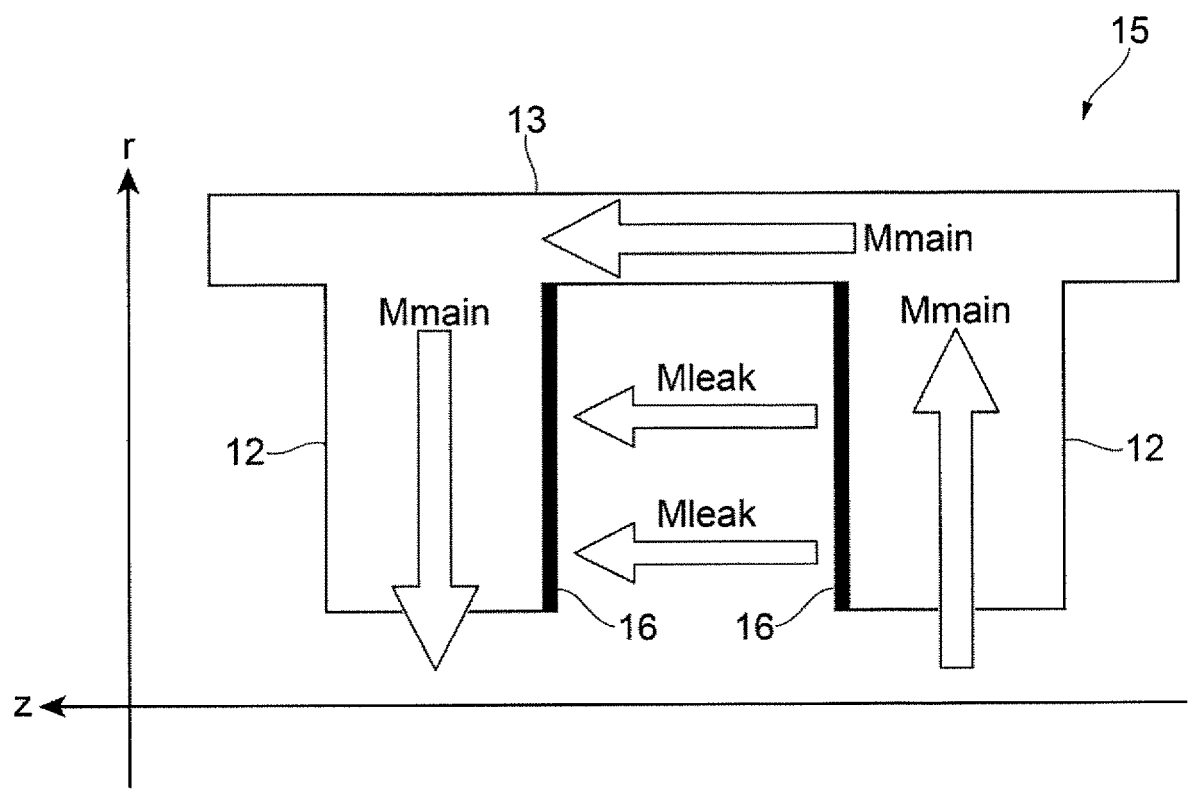
FIG. 3 is a diagram schematically showing a side surface of a part of an armature core of a conventional cylindrical linear motor.

The leakage magnetic flux will be below described with reference to an example, which is an armature core 15 of an armature in a conventional cylindrical linear motor as shown in FIG. 3. In the following description, the direction of the axis of the armature core 15 may be referred to as an axis direction or z-direction, and the direction orthogonal to the axis of the armature core 15 may be referred to as a radius direction or r-direction. The armature core 15 includes a plurality of teeth 12, which are aligned circumferentially at two axial positions that are spaced in the z-direction. FIG. 3 is a partially cross-sectional side view showing only one of cross sections of the armature core 15 with respect to the r-direction.

The cross section shown in FIG. 3 includes two teeth 12 included in the plurality of teeth 12 and spaced in the z-direction, and a back yoke 13 interconnecting respective outer ends of the two teeth 12 in the r-direction. A not-graphically-shown conducting wire is wound around each of the two teeth 12 to form an armature coil. The armature core 15 shown in FIG. 3 generates a main magnetic flux indicated by an arrow Mmain, which enters the back yoke 13 from the right tooth 12 in FIG. 3, passes through the back yoke 13, and comes out of the left tooth 12. Meanwhile, in the armature core 15, a leakage magnetic flux indicated by an arrow Mleak is generated, passing through a space between tooth opposition surfaces 16 opposed to each other in the z-direction in the two teeth 12 from one to the other of the tooth opposition surfaces 16.

The current applied to the armature coil flows around each of the teeth 12 to form a current loop and, therefore, the main magnetic flux passing through the armature core 15 interlinks the current loop to thereby contribute to driving. Specifically, the interaction between the magnetic field formed by the current loop and the main magnetic flux brings the magnetic pole element into relative movement to the armature. Meanwhile, the contribution of the leakage magnetic flux to the driving is little. It is, therefore, desirable to reduce the leakage magnetic flux and change it to a main magnetic flux passing through the armature core 15.

The amount of the leakage magnetic flux is proportional to the area of the tooth opposition surface 16. It is, therefore, effective for reducing the leakage magnetic flux to render the area of the tooth opposition surface 16 small.

There will be described how to render the areas of the tooth opposition surfaces 16 small, with reference to FIGS. 4A, 4B, and 4C. Also in the description, the longitude direction of the axis of the armature core 15 may be referred to as z-direction, the circumference direction about the axis of the armature core 15 may be referred to as p-direction, and the direction orthogonal to the axis may be referred to as r-direction.

Figure 4A:
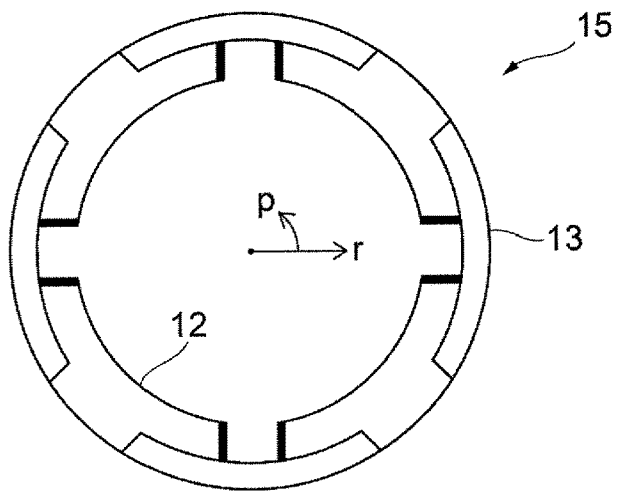
FIG. 4A is a cross-sectional plan view of an electric motor core of a conventional cylindrical linear motor.
Figure 4B:
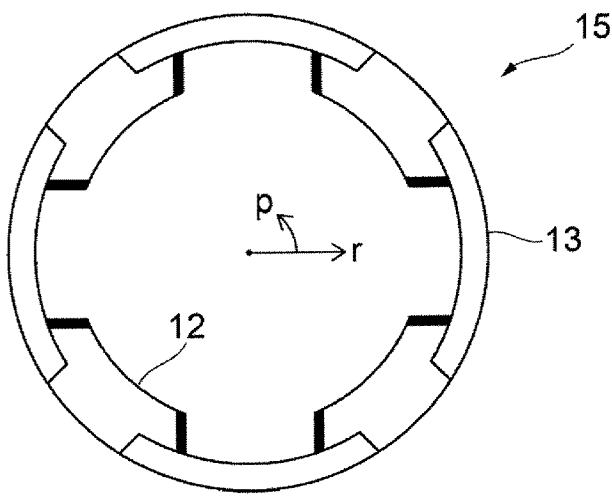
FIG. 4B is a cross-sectional plan view showing an electric motor core obtained by reducing the circumferential dimension of each of teeth of the electric motor core shown in FIG. 4A.

FIG. 4A is a cross-sectional plan view of an armature core 15 of a conventional cylindrical linear motor as viewed in the z-direction. In the drawing, the armature core 15 includes a plurality of teeth 12 aligned and spaced in the p-direction, and a back yoke 13 connected to the plurality of teeth 12. The area of the tooth opposition surface (the tooth opposition surface 16 shown in FIG. 3) in the armature core 15 is equivalent to the area of the tooth 12 viewed in the z-direction, that is, in the depth direction in FIG. 4A. In order to reduce the area, for example, it might be done to render the length of each of the teeth 12 in the p-direction small as shown in FIG. 4B; however, it would also render the cross-sectional area of the tooth 12 through which the main magnetic flux passes in the r-direction small. Regarding the generated magnetic flux, the part having the smallest cross-sectional area in each of the teeth 12 is most likely to be affected by magnetic saturation and, therefore, the part is dominant with respect to the generated magnetic flux. Specifically, the main magnetic flux is restricted by the cross-sectional area of the innermost surface, with respect to the r-direction, out of the teeth 12. The change as shown in FIG. 4B, therefore, involves a decrease in the magnetic flux generated by the magnetic pole element and the excitation current.

Figure 4C:
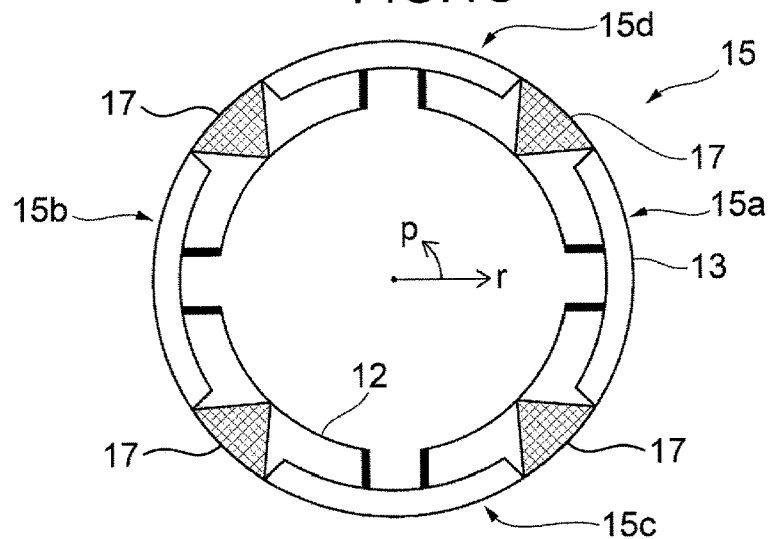
FIG. 4C is a cross-sectional plan view showing an electric motor core obtained by deleting a surplus portion of the electric motor core shown in FIG. 4B.

In contrast, dividing the armature core 15 into a plurality of armature core portions (four armature core portions 15a, 15b, 15c, and 15d in the graphically shown example) so as to eliminate a surplus part 17 out of the armature core 15, that is, a part having no affect on the main magnetic flux, as shown in FIG. 4C, to increase the total number of teeth and armature coils makes it possible to render the area of the tooth opposition surface (the tooth opposition surface 16 shown in FIG. 3) small to reduce the leakage magnetic flux without reducing the sum of the cross-sectional areas of respective innermost surfaces, with respect to the r-direction, of the teeth 12.

Figure 5:
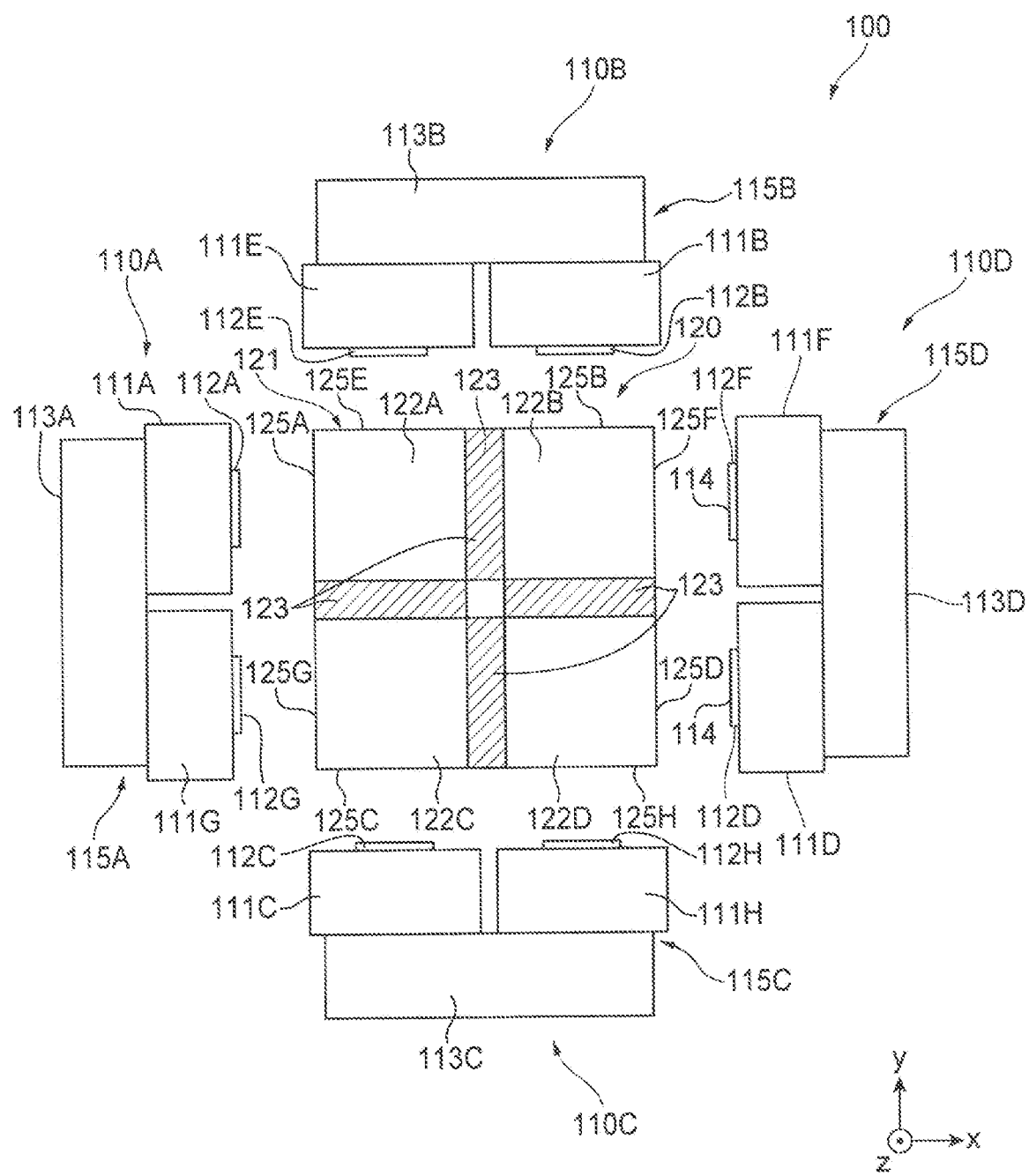
FIG. 5 is a front view of a linear motor according to a first embodiment of the present invention.

FIG. 5 is a front view of a linear motor 100 according to the first embodiment of the present invention configured based on the above concept, and FIG. 6 is a perspective view thereof. The linear motor 100 includes a magnetic pole element 120 and an armature disposed around the magnetic pole element 120. The armature is divided into a plurality of armature portions, which include a first armature portion 110A, a second armature portion 110B, a third armature portion 110C, and a fourth armature portion 110D. In other words, the armature includes a plurality of armature portions, which include the first to fourth armature portions 110A to 110D. FIG. 6 shows only the first armature portion 110A out of the first to fourth armature portions 110A to 110D. The armature forms a magnetic field for bringing the magnetic pole element 120 into relative movement to the armature in a specific linear motion direction, that is, for moving the magnetic pole element 120 linearly and relatively to the armature. The linear motion direction is a depth direction in FIG. 5, which may be referred to as z-direction in the following description. In the present embodiment, the magnetic pole element 120 is a movable element, while the armature including the first to fourth armature portions 110A to 110D is a stator. However, it is also possible that the armature is a movable element while the magnetic pole element 120 is a stator.

The magnetic pole element 120 includes a plurality of magnetic cores and a plurality of permanent magnets 123. Each of the magnetic cores is formed of a magnetic material and has a plurality of magnetic pole surfaces opposable to the armature. The plurality of permanent magnets 123 are disposed so as to be interposed between adjacent magnetic pole element cores that are adjacent to each other among the plurality of magnetic pole element cores.

The plurality of magnetic pole element cores include: a plurality of first cores 122A aligned in the linear motion direction, namely, the z-direction in FIG. 5; a plurality of second cores 122B aligned in the linear motion direction; a plurality of third cores 122C aligned in the linear motion direction; and a plurality of fourth cores 122D aligned in the linear motion direction. The first cores 122A are adjacent to the second cores 122B, respectively, in a first alignment direction orthogonal to the linear motion direction, namely, the x-direction in FIG. 5, and adjacent to the third cores 122C, respectively, in a second alignment direction orthogonal to each of the linear motion direction and the first alignment direction, namely, the y-direction in FIG. 5. The fourth cores 122D is adjacent to the second cores 122B, respectively, in the second alignment direction, namely, the y-direction in FIG. 5, and adjacent to the third cores 122C, respectively, in the first alignment direction, namely, the x-direction in FIG. 5. In the magnetic pole element 120 taking the posture shown in FIG. 5, the plurality of first cores 122A constitute a columnar part extending in the z-direction at an upper left position; the plurality of first cores 122B constitute a columnar part extending in the z-direction at an upper right position; the plurality of third cores 122C constitute a columnar part extending in the z-direction at a lower left position; and the plurality of fourth cores 122D constitute a columnar part extending in the z-direction at a lower right position.

The plurality of magnetic pole surfaces of each of the first cores 122A includes a first magnetic pole surface 125A and a fifth magnetic pole surface 125E. The first magnetic pole surface 125A faces a side (left side in FIG. 5) opposite to the plurality of second cores 122B in the first alignment direction, namely, the x-direction in FIG. 5, and the fifth magnetic pole surface 125E faces a side (upper side in FIG. 5) opposite to the plurality of third cores 122C in the second alignment direction, namely, the y-direction in FIG. 5.

The plurality of magnetic pole surfaces of each of the second cores 122B includes a second magnetic pole surface 125B and a sixth magnetic pole surface 125F. The second magnetic pole surface 125B faces a side (upper side in FIG. 5) opposite to the plurality of fourth cores 122D in the second alignment direction, and the sixth magnetic pole surface 125F faces a side (right side in FIG. 5) opposite to the plurality of first cores 122A in the first alignment direction.

The plurality of magnetic pole surfaces of each of the third cores 122C includes a third magnetic pole surface 125C and a seventh magnetic pole surface 125G. The third magnetic pole surface 125C faces a side (lower side in FIG. 5) opposite to the plurality of first cores 122A in the second alignment direction, and the seventh magnetic pole surface 125G faces a side (left side in FIG. 5) opposite to the plurality of fourth cores 122D in the first alignment direction.

The plurality of magnetic pole surfaces of each of the fourth cores 122D include a fourth magnetic pole surface 125D and an eighth magnetic pole surface 125H. The fourth magnetic pole surface 125D faces a side (right side in FIG. 5) opposite to the plurality of third cores 122C in the first alignment direction, and the eighth magnetic pole surface 125H faces a side (lower side in FIG. 5) opposite to the plurality of second cores 122B in the second alignment direction.

The plurality of permanent magnets 123 are interposed between adjacent cores that are adjacent to each other among the plurality of magnetic pole element cores, respectively. Each of the permanent magnets has a first magnet surface opposed to one of the adjacent cores and a second magnet surface facing the opposite side to the first magnet surface, and the first magnet surface and the second magnet surface constitute mutually opposite magnetic poles. The plurality of permanent magnets 123 are arranged such that the magnetic pole surfaces adjacent to each other constitute mutually opposite magnetic poles in a magnetic pole surface group constituted by the plurality of magnetic pole surfaces of the plurality of magnetic pole element cores. For example, as to the plurality of first magnetic pole surfaces 125A aligned in the linear motion direction (z-direction), the plurality of permanent magnets 123 are arranged such that respective magnetic poles of the plurality of first magnetic pole surfaces 125A are alternately inverted in the linear motion direction, that is, the N-pole and the S-pole are alternately aligned. Similarly, respective magnetic poles of the plurality of permanent magnets 123 are arranged such that the eight magnetic pole surfaces aligned in order in the direction orthogonal to the z-direction, namely, the clockwise direction in FIG. 5, namely, including the first magnetic pole surface 125A, the fifth magnetic pole surface 125E, the second magnetic pole surface 125B, the sixth magnetic pole surface 125F, the fourth magnetic pole surface 125D, the eighth magnetic pole surface 125H, the third magnetic pole surface 125C, and the seventh magnetic pole surface 125G, are alternately inverted in the clockwise direction, that is, the N-pole and the S-pole are alternately aligned. This causes the two magnetic pole element cores adjacent to each other in any direction to attract each other by magnetic force to thereby allow the plurality of magnetic pole element cores to be easily assembled in an array as shown in FIG. 6.

As shown in FIG. 5, the magnetic pole element 120 is disposed so as to be surrounded by the first to fourth armature portions 110A to 110D on respective four sides. As shown in FIG. 6, the entire magnetic pole element 120 has a quadrangular prism shape extending in the z-direction. The magnetic pole element 120 is composed of a plurality of unit cells aligned in the z-direction, each of which is equivalent to the unit cell 20 shown in FIG. 1 or the unit cell 30 shown in FIG. 2. Specifically, the magnetic pole element 120 includes a plurality of magnetic pole blocks, which include a plurality of magnetic block groups, and each of the magnetic block groups includes the first to fourth magnetic blocks 211 to 214 shown in FIG. 2. Specifically, the magnetic pole element 120 shown in FIG. 6 is constituted by three first unit cells aligned in the z-direction and a single second unit cell followingly aligned therewith in the z-direction, the first unit cell being equivalent to the unit cell 20 shown in FIG. 1 and the second unit cell being equivalent to the unit cell 30 shown in FIG. 2. In the magnetic pole element 120 illustrated in FIG. 6, therefore, the number of magnetic pole blocks aligned in each of the x-direction and the y-direction is two, and the number of magnetic pole blocks aligned in the z-direction is five.

The magnetic pole element 120 shown in FIG. 6 is disposed in such a posture that the front side part of the unit cell 20 shown in FIG. 1 is coincident with the left part of the magnetic pole element 120 and the back side part of the unit cell 20 shown in FIG. 1 is coincident with the right part of the magnetic pole element 120 shown in FIG. 6. In other words, the magnetic pole element cores 22 included in the first to fourth magnetic pole blocks 211 to 214 shown in FIG. 1, respectively, corresponds to a plurality of magnetic pole element cores in the magnetic pole element 120 shown in FIG. 6, namely, the plurality of first to fourth cores 122A to 122D, respectively. The plurality of permanent magnets 23 of the unit cell 20 shown in FIG. 1 correspond to the plurality of permanent magnets 123 in the magnetic pole element 120 shown in FIG. 6. The eight magnetic pole surfaces 25 shown in FIG. 1 correspond to the first to eighth magnetic pole surfaces 125A to 125H shown in FIG. 6.

The magnetic pole element 120 shown in FIG. 6 is disposed in such a posture that the front side part of the unit cell 30 shown in FIG. 2 is coincident with the left part of the magnetic pole element 120 and the back part of the unit cell 30 shown in FIG. 2 is coincident with the right part of the magnetic pole element 120 shown in FIG. 6. In other words, the magnetic pole element core 22s included in the first to fourth magnetic pole blocks 211 to 214 shown in FIG. 2, respectively, correspond to the plurality of magnetic cores in the magnetic pole element 120 shown in FIG. 6, namely, the plurality of first to fourth cores 122A to 122D, respectively. In addition, the fifth to eighth magnetic pole blocks 215 to 217 shown in FIG. 2 (the eighth magnetic pole blocks are not graphically shown) correspond to the first to fourth cores 122A to 122D of the magnetic pole element 120 shown in FIG. 6, respectively. The plurality of permanent magnets 23 shown in FIG. 2 correspond to the plurality of permanent magnets 123 shown in FIG. 6. The magnetic pole surfaces 25 shown in FIG. 2 correspond to the first to eighth magnetic pole surfaces 125A to 125H shown in FIG. 6.

The first armature portion 110A includes a plurality of first coil cores 112A, a plurality of seventh coil cores 112G, a plurality of first coils 111A, a plurality of seventh coils 111G, and a first back yoke 113A. In this embodiment, the plurality of first coil cores 112A, the plurality of seventh coil cores 112G, and the first back yoke 113A are integrally formed as a first armature core 115A made of a magnetic material. The plurality of first coil cores 112A are aligned in the linear motion direction (z-direction in FIG. 5) so as to be opposable to the first magnetic pole surfaces 125A of the plurality of first cores 122A in the first alignment direction (x-direction in FIG. 5). The plurality of seventh coil cores 112G are aligned in the linear motion direction so as to be opposable to the seventh magnetic pole surfaces 125G of the third cores 122C in the first alignment direction. The plurality of first coils 111A are formed of a conductive wire wound around each of the first coil cores 112A, and generate a magnetic flux flowing between each of the first coil cores 112A and the first magnetic pole surface 125A by a current flowing through the conductive wire. The plurality of seventh coils 111G are formed of a conductive wire wound around each of the seventh coil cores 112G, and generate a magnetic flux flowing between each of the seventh coil cores 112G and the seventh magnetic pole surface 125G by a current flowing through the conductive wire.

The first back yoke 113A interconnects the plurality of first coil cores 112A and the plurality of seventh coil cores 112G so as to allow magnetic flux to flow between the plurality of first coil cores 112A and the plurality of seventh coil cores 112G. Specifically, the first back yoke 113A has a flat plate shape parallel to the first and seventh magnetic pole surfaces 125A and 125G, and the plurality of first coil cores 112A and the plurality of seventh coil cores 112G are projected toward the first and seventh magnetic pole surfaces 125A and 125G (rightward in FIG. 5) from a surface of the first back yoke 113A, the surface opposed to the first and seventh magnetic pole surfaces 125A and 125G in the first alignment direction, to thereby form teeth each having, for example, a rectangular parallelepiped shape.

The second armature portion 110B includes a plurality of second coil cores 112B, a plurality of fifth coil cores 112E, a plurality of second coils 111B, a plurality of fifth coils 111E, and a second back yoke 113B. The plurality of second coil cores 112B, the plurality of fifth coil cores 112E and the second back yoke 113B, in this embodiment, are integrally formed as a second armature core 115B made of a magnetic material. The plurality of second coil cores 112B are aligned in the linear motion direction (z-direction in FIG. 5) so as to be opposable to the second magnetic pole surfaces 125B of the plurality of second cores 122B in the second alignment direction (y-direction in FIG. 5). The plurality of fifth coil cores 112E are aligned in the linear motion direction so as to be opposable to the fifth magnetic pole surfaces 125E of the first cores 122A in the second alignment direction. The plurality of second coils 111B are formed of a conductive wire wound around each of the second coil cores 112B, and generate a magnetic flux flowing between each of the second coil cores 112B and the second magnetic pole surface 125B by a current flowing through the conductive wire. The plurality of fifth coils 111E are each formed of a conductive wire wound around each of the fifth coil cores 112E, and generate a magnetic flux flowing between each of the fifth coil cores 112E and the fifth magnetic pole surface 125E by a current flowing through the conductive wire.

The second back yoke 113B interconnects the plurality of second coil cores 112B and the plurality of fifth coil cores 112E so as to allow magnetic flux to flow between the plurality of second coil cores 112B and the plurality of fifth coil cores 112E. Specifically, the second back yoke 113B has a flat plate shape parallel to the second and fifth magnetic pole surfaces 125B and 125E, and the plurality of second coil cores 112B and the plurality of fifth coil cores 112E are projected toward the second and fifth magnetic pole surfaces 125B and 125E (downward in FIG. 5) from a surface of the second back yoke 113B (lower surface in FIG. 5), the surface opposed to the second and fifth magnetic pole surfaces 125B and 125E in the second alignment direction, to thereby form teeth each having, for example, a rectangular parallelepiped shape.

The third armature portion 110C includes a plurality of third coil cores 112C, a plurality of eighth coil cores 112H, a plurality of third coils 111C, a plurality of eighth coils 111H, and a third back yoke 113C. The plurality of third coil cores 112C, the plurality of eighth coil cores 112H, and the third back yoke 113C, in this embodiment, are integrally formed as a third armature core 115C made of a magnetic material. The plurality of third coil cores 112C are aligned in the linear motion direction (z-direction in FIG. 5) so as to be opposable to the third magnetic pole surfaces 125C of the third cores 122C in the second alignment direction (y-direction in FIG. 5). The plurality of eighth coil cores 112H are aligned in the linear motion direction so as to be opposable to the eighth magnetic pole surface 125H of the fourth cores 122D in the second alignment direction. The plurality of third coils 111C are formed of a conductive wire wound around each of the third coil cores 112C, and generate a magnetic flux flowing between each of the third coil cores 112C and the third magnetic pole surface 125C by a current flowing through the conductive wire. The plurality of eighth coils 111H are formed of a conductive wire wound around each of the eighth coil cores 112H, and generate a magnetic flux flowing between each of the eighth coil cores 112H and the eighth magnetic pole surface 125H by a current flowing through the conductive wire.

The third back yoke 113C interconnects the plurality of third coil cores 112C and the plurality of eighth coil cores 112H so as to allow magnetic flux to flow between the plurality of third coil cores 112C and the plurality of eighth coil cores 112H. Specifically, the third back yoke 113C has a flat plate shape parallel to the third and eighth magnetic pole surfaces 125C and 125H, and the plurality of third coil cores 112C and the plurality of eighth coil cores 112H are projected toward the third and eighth magnetic pole surfaces 125C and 125H (upward in FIG. 5) from a surface of the third back yoke 113C (upper surface in FIG. 5), the surface opposed to the third and eighth magnetic pole surfaces 125C and 125H in the second alignment direction, to thereby form teeth each having, for example, a rectangular parallelepiped shape.

The fourth armature portion 110D includes a plurality of fourth coil cores 112D, a plurality of sixth coil cores 112F, a plurality of fourth coils 111D, a plurality of sixth coils 111F, and a fourth back yoke 113D. The plurality of fourth coil cores 112D, the plurality of sixth coil cores 112F and the fourth back yoke 113D, in this embodiment, are integrally formed as a fourth armature core 115D made of a magnetic material. The plurality of fourth coil cores 112D are aligned in the linear motion direction (z-direction in FIG. 5) so as to be opposable to the fourth magnetic pole surfaces 125D of the fourth cores 122D in the first alignment direction (x-direction in FIG. 5). The plurality of sixth coil cores 112F are aligned in the linear motion direction so as to be opposable to the sixth magnetic pole surfaces 125F of the plurality of second cores 122B in the first alignment direction. The plurality of fourth coils 111D are formed of a conductive wire wound around each of the fourth coil cores 112D, and generate a magnetic flux flowing between each of the fourth coil cores 112D and the fourth magnetic pole surface 125D by a current flowing through the conductive wire. The plurality of sixth coils 111F are formed of a conductive wire wound around each of the sixth coil cores 112F, and generate a magnetic flux flowing between each of the sixth coil cores 112F and the sixth magnetic pole surface 125F by a current flowing through the conductive wire.

The fourth back yoke 113D interconnects the plurality of fourth coil cores 112D and the plurality of sixth coil cores 112F so as to allow magnetic flux to flow between the plurality of fourth coil cores 112D and the plurality of sixth coil cores 112F. Specifically, the fourth back yoke 113D has a flat plate shape parallel to the fourth and sixth magnetic pole surfaces 125D and 125F, and the plurality of fourth coil cores 112D and the plurality of sixth coil cores 112F are projected toward the fourth and sixth magnetic pole surfaces 125D and 125F (leftward in FIG. 5) from a surface of the fourth back yoke 113D (left surface in FIG. 5), the surface opposed to the fourth and sixth magnetic pole surfaces 125D and 125F in the first alignment direction, to thereby form teeth each having, for example, a rectangular parallelepiped shape.

Each of the first to fourth armature cores 115A to 115D is form of, for example, a soft magnetic material such as soft iron or soft ferrite. Each of the first to fourth armature cores 115A to 115D may have, for example, an arc shape like the armature core portions 15a to 15d shown in FIG. 4C.

Figure 7:
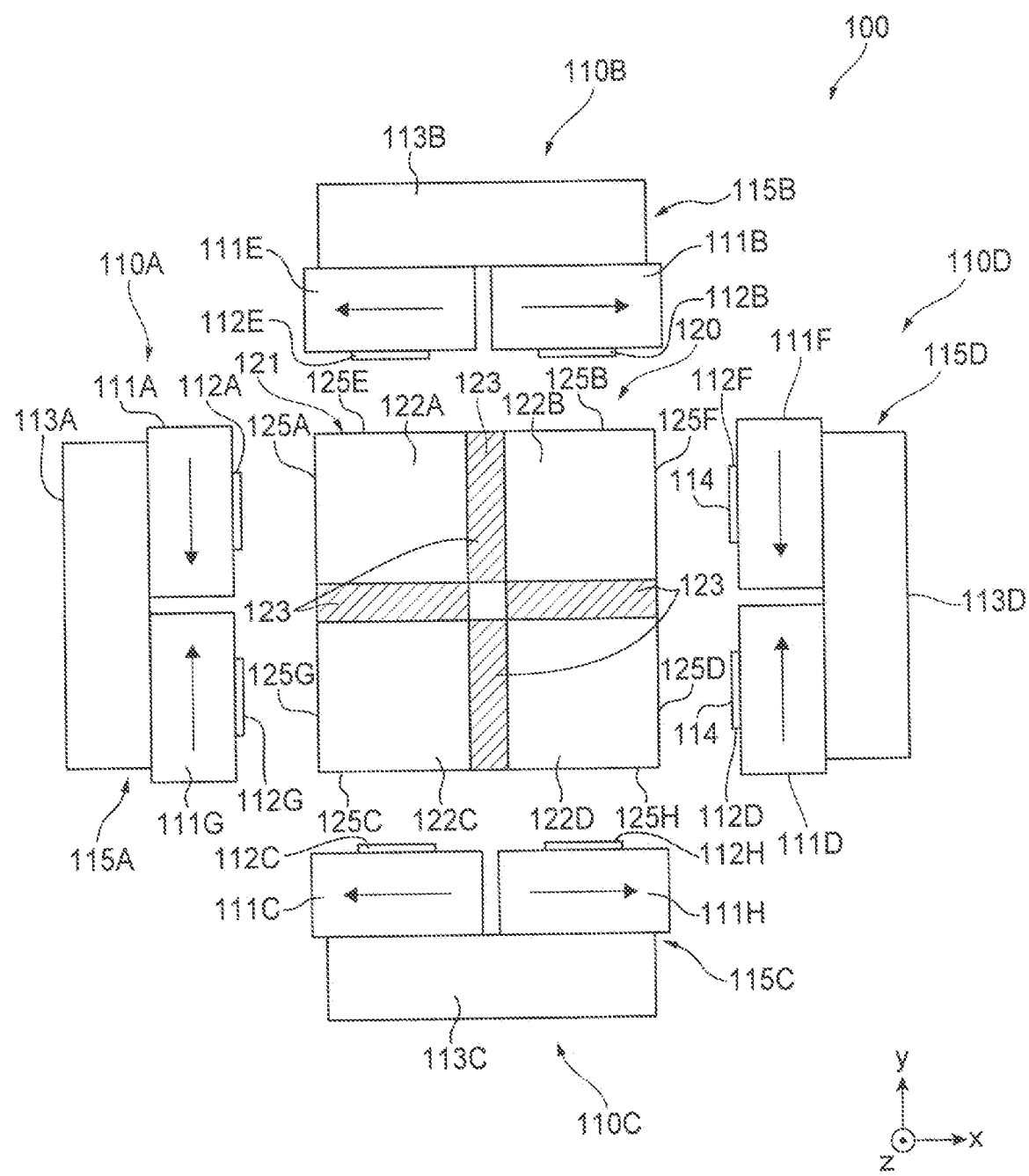
FIG. 7 is a front view showing a current path in an armature coil of the linear motor according to the first embodiment.
Figure 8:
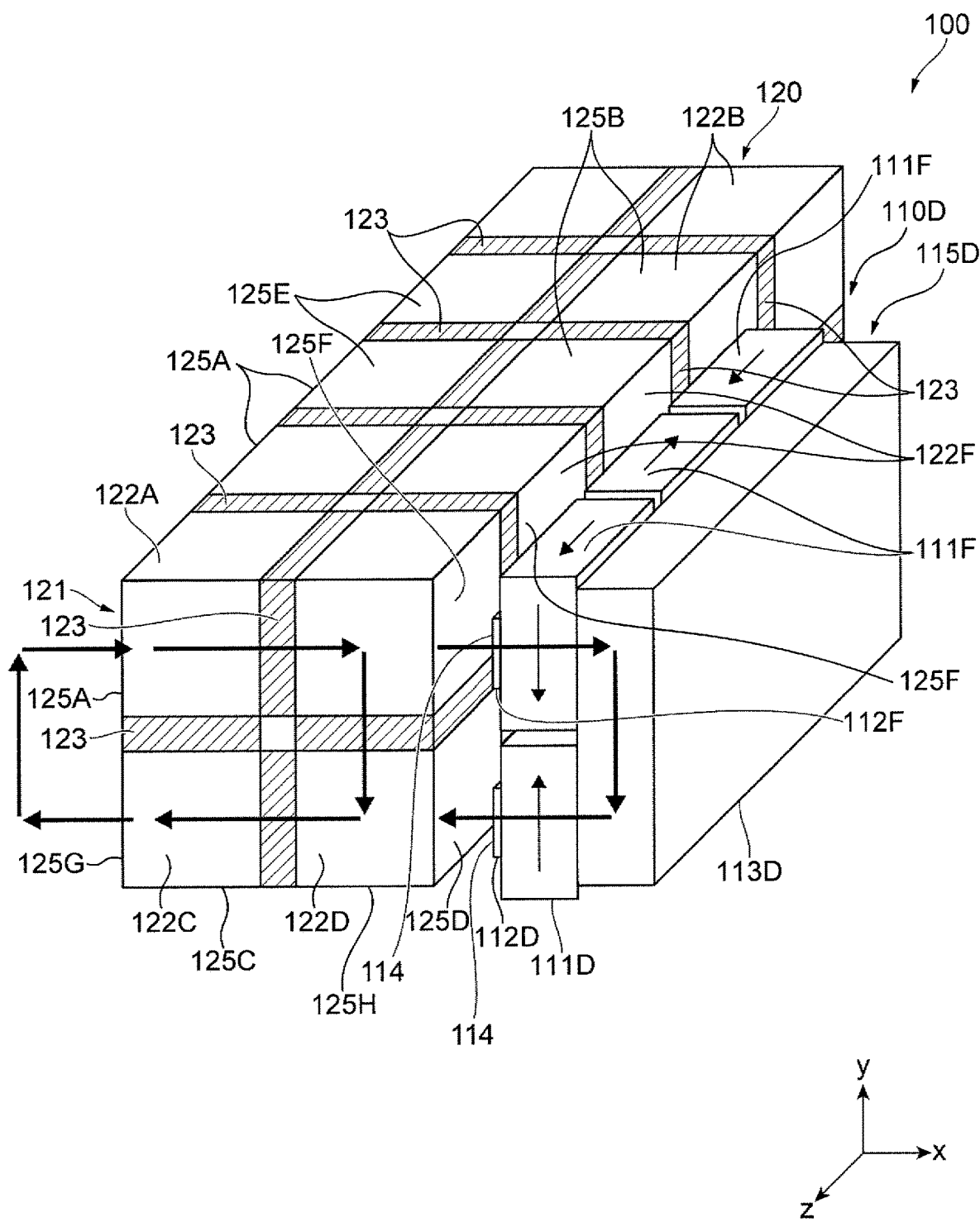
FIG. 8 is a perspective view showing a magnetic path generated by the armature coil of the linear motor according to the first embodiment.

FIG. 7 shows respective arrows indicating current paths in the first to eighth coils 111A to 111H. The current thus flowing through each of the first to eighth coils 111A to 111H generates a magnetic field around the first to eighth coils 111A to 11111. FIG. 8 is a perspective view showing a magnetic path generated by the sixth and fourth coils 111F and 111D. A current is made flow in adjacent two coils that are adjacent to each other in the first alignment direction or the second alignment direction (e.g., the sixth and fourth coils 111F and 111D adjacent to each other in the second alignment direction in FIG. 8) in the same armature portion, thereby generating a magnetic path passing through two tooth parts (e.g., the sixth and fourth coil cores 112F and 112D in FIG. 8) in which the two coils are disposed, the back yoke (e.g., the fourth back yoke 113D in FIG. 8) connected to the two tooth parts, and the space between the tooth parts (e.g., the space between the sixth and fourth coil cores 112F and 112D in FIG. 8). At this time, the surface opposed to the magnetic pole element 120 in each of the tooth parts serves as an armature magnetic pole surface 114 as shown in FIG. 8. The armature magnetic pole surface 114 of one of the two tooth parts (e.g., the sixth coil core 112F shown in FIG. 8) becomes the S-pole, and the armature magnetic pole surface 114 of the other tooth part (e.g., the sixth coil core 112F shown in FIG. 8) becomes the N-pole.

Respective positions of the armature magnetic pole surfaces 114 and respective positions of the first to eighth magnetic pole surfaces (magnetic-pole-element magnetic pole surfaces) 125A to 125H are coincident with each other when viewed in the linear motion direction, namely, the z-direction. In other words, in a front view, the armature magnetic pole surfaces 114 and the first to eighth magnetic pole surfaces 125A to 125H are opposed to each other in one-to-one correspondence. This allows a current that flows through each of the first to eighth coils 111A to 111H to cause the armature magnetic pole surfaces 114 and the first to eighth magnetic pole surfaces 125A to 125H corresponding thereto to be made attract or repel each other by magnetic force. For example, FIG. 8 shows a magnetic path causing the armature magnetic pole surfaces 114 of the sixth and fourth coil cores 112F and 112D and the sixth and fourth magnetic pole surfaces 125F and 125D to attract each other. The control of current flowing through the coil to thus change the magnetic field generated by each coil can move the magnetic pole element 120 in the linear motion direction, namely, the z-direction, relatively to the first to fourth armature portions 110A to 110D.

The magnetic flux generated by each of the first to eighth coils 111A to 111H as described above passes through the interior of the magnetic pole element 120. Specifically, the magnetic flux having come out of the armature magnetic pole surface 114 of the N-pole out of the armature magnetic pole surfaces 114 enters the magnetic-pole-element magnetic pole surface of the S-pole out of the plurality of first to eighth magnetic pole surfaces 125A to 125H, and passes through all of the permanent magnets 123 that are in contact with the magnetic pole element cores that include the magnetic pole surfaces of the S-pole, out of the plurality of first to eighth cores 122A to 122H. The magnetic flux having come out of the permanent magnet 123 enters the permanent magnet 123 of the adjacent magnetic pole block, then comes out of the magnetic-pole-element magnetic pole surface of the N-pole and enters the armature magnetic pole surface 114 of the S-pole. In the linear motor 100 according to the present embodiment, thus, the magnetic flux generated by the first to fourth armature portions 110A to 110D passes through all of the permanent magnets 123 included in the magnetic pole element 120. The permanent magnets 123 in the magnetic pole element 120, disposed so as to surround each of the first to eighth cores 122A to 122H, allow the magnetic flux generated in the plurality of magnetic-pole-element magnetic pole surfaces (the plurality of first to eighth magnetic pole surfaces 125A to 125 H) to be increased as compared with a case where the permanent magnet is attached only to the two surfaces of the magnetic pole element cores like the conventional magnetic pole element. This enables the magnetic efficiency of the linear motor 100 to be enhanced.

In the linear motor 100 according to the embodiment, where the magnetic path generated in the magnetic pole element 120 by each of the first to fourth armature portions 110A to 110D can pass through the armature cores of the armature portion on the opposite side across the magnetic pole element 120, the magnetic pole element 120 requires no back yoke.

The intervals between adjacent armature portions that are adjacent to each other among the first to fourth armature portions 110A to 110D are arbitrarily set. For example, it is also possible either to set the interval between the first to fourth armature portions 110A to 110D to an interval small enough to bring the first to fourth armature portions 110A to 110D into a substantially tubular shape as a whole or, conversely, to separate the armature portions adjacent to each other from each other at respective large intervals.

Figure 9:
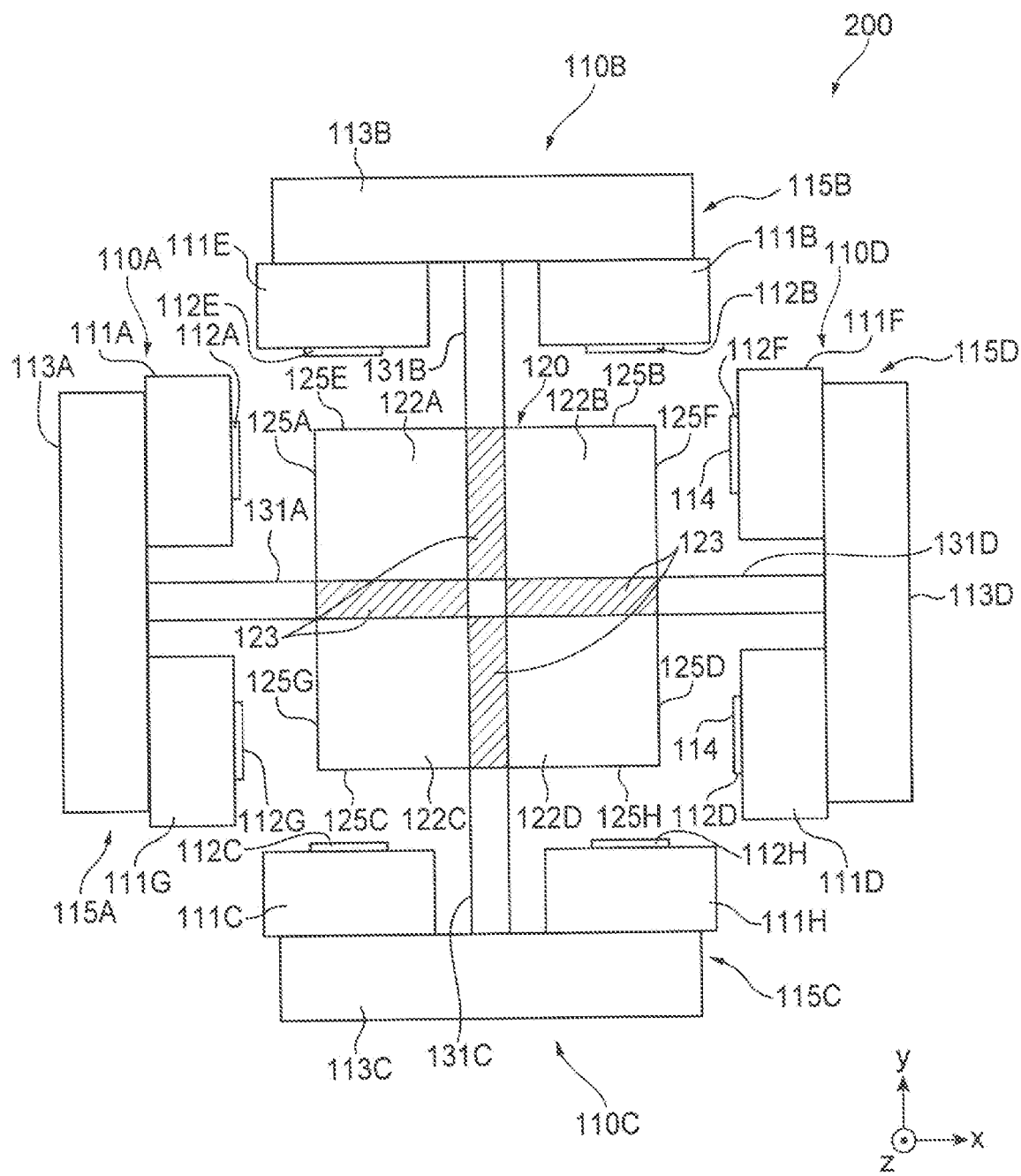
FIG. 9 is a front view of a linear motor according to a second embodiment of the present invention.

FIG. 9 is a front view of a linear motor 200 according to a second embodiment of the present invention. The linear motor 200 includes a plurality of restraint members in addition to all the same components as the components of the linear motor 100. The plurality of restraint members, each of which is preferably formed of a non-magnetic material, are disposed around the magnetic pole element 120 to restrain the magnetic pole element 120 from relative movement to the armature (first to fourth armature portions 110A to 110D) in a direction except for the linear motion direction. This stabilizes the direction of the relative movement of the magnetic pole element 120 to the first to fourth armature portions 110A to 110D regardless of the dispersive arrangement of the first to fourth armature portions 110A to 110D.

The plurality of restraint members include a first restraint member 131A, a second restraint member 131B, a third restraint member 131C, and a fourth restraint member 131D, each of which extends in the linear motion direction, namely, the z-direction. The first restraint member 131A is interposed between the inner surface of the first back yoke 113A out of the first to fourth back yokes 113A to 113D included in the first to fourth armature portions 110A to 110D, i.e., the right surface in FIG. 9, and the permanent magnet 132 opposed to the first back yoke 113A in the magnetic pole element 120, i.e., the permanent magnet 132 interposed between the first core 122A and the third core 122C in FIG. 9, to restrain the magnetic pole element 120 from approaching the first back yoke 113A in the first alignment direction (x-direction: leftward in FIG. 9). Similarly, the second restraint member 131B is interposed between the inner surface of the second back yoke 113B, i.e., the lower surface in FIG. 9, and the permanent magnet 132 opposed to the back yoke 113B, i.e., the permanent magnet 132 interposed between the first core 122A and the second core 122B in FIG. 9, to restrain the magnetic pole element 120 from approaching the second back yoke 113B in the second alignment direction (y-direction: upward in FIG. 9). The third restraint member 131C is interposed between the inner surface of the third back yoke 113C, i.e., the upper surface in FIG. 9, and the permanent magnet 132 opposed to the back yoke 113C, i.e., the permanent magnet 132 interposed between the third core 122C and the fourth core 122D in FIG. 9, to restrain the magnetic pole element 120 from approaching the third back yoke 113C in the second alignment direction (y-direction: downward in FIG. 9); the fourth restraint member 131D is interposed between the inner surface of the fourth back yoke 113D, i.e., the left surface in FIG. 9, and the permanent magnet 132 opposed to the fourth back yoke 113D, i.e., the permanent magnet 132 interposed between the second core 122B and the fourth core 122D in FIG. 9, to restrain the magnetic pole element 120 from approaching the fourth back yoke 113D in the first alignment direction (x-direction: rightward in FIG. 9).

The first to fourth restraint members 131A to 131D are fixed to the first to fourth back yokes 113A to 113D, respectively, while allowing the magnetic pole element 120 to slide in the linear motion direction against the first to fourth restraint members 131A to 131D. The first to fourth restraint members 131A to 131D, alternatively, may be fixed to the magnetic pole element 120 while allowed to slide against the first to fourth back yokes 113A to 113D.

The thus arranged first to fourth restraint members 131A to 131D stabilize the direction of the relative movement of the magnetic pole element 120 to the first to fourth armature portions 110A to 110D without interrupting a magnetic path formed between the magnetic pole element 120 and the first to eighth coil cores 112A to 112H. The plurality of restraint members do not absolutely have to include all of the first to fourth restraint members 131A to 131D. For example, in the linear motor 200 shown in FIG. 9, the fourth restraint member 131D may be replaced with another restraint member to restrain the magnetic pole element 120 from rightward movement.

Figure 10:
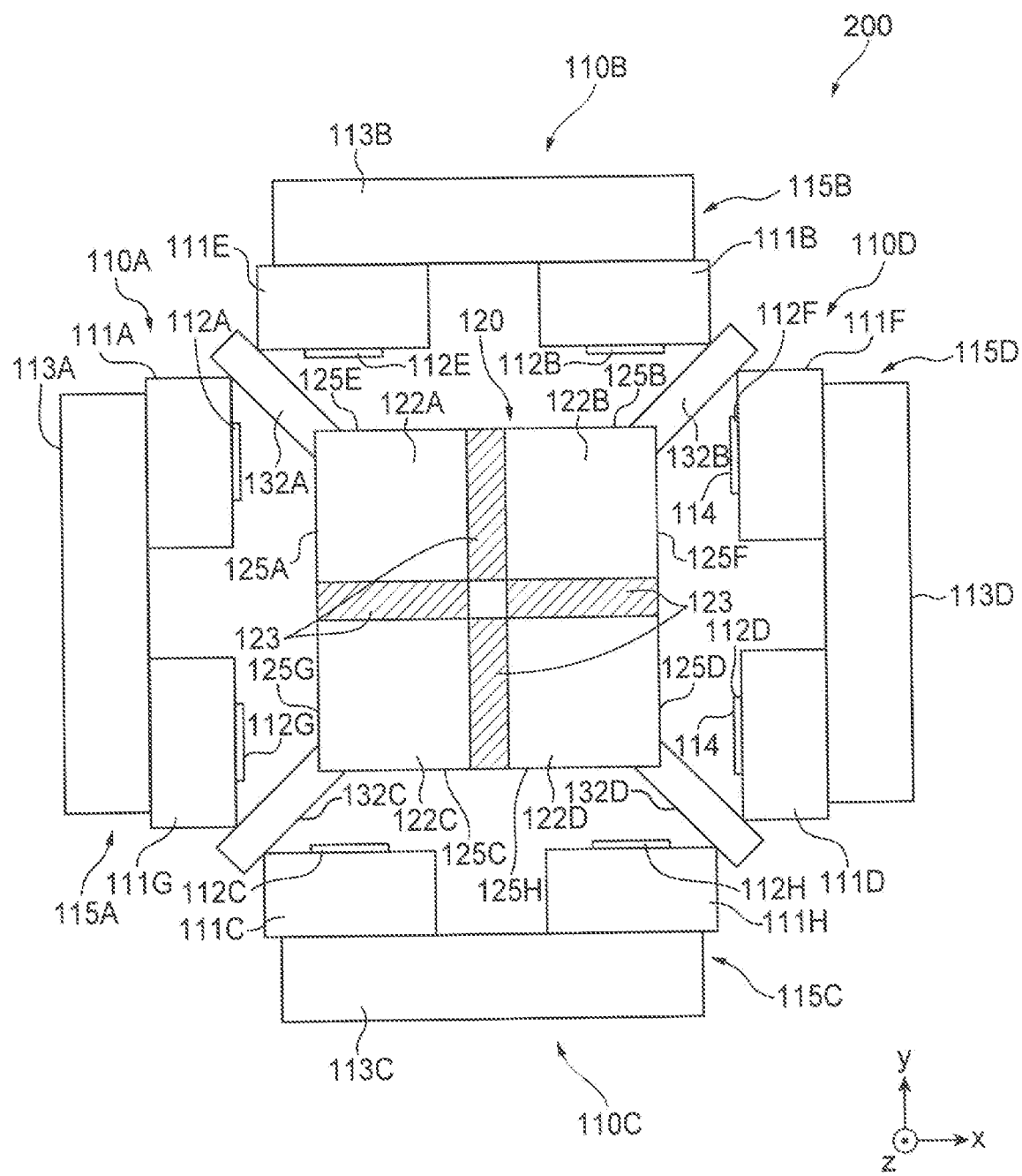
FIG. 10 is a front view of a linear motor according to a modification of the second embodiment.

FIG. 10 is a front view showing another example of the plurality of restraint members. The plurality of restraint members according to this example include a plurality of guide target members, which include a first guide target member 132A, a second guide target member 132B, a third guide target member 132C and a fourth guide target member 132D, each of which extends in the linear motion direction, namely, the z-direction. Each of the guide target members is fixed to the magnetic pole element 120 and interposed between adjacent armature portions that are adjacent to each other among the first to fourth armature portions 110A to 110D to be thereby allowed to be guided in the linear motion direction by the adjacent armature portions. Specifically, the first guide target member 132A has a fixed end to be fixed to an outer corner of the plurality of first cores 122A, that is, a boundary part between the first magnetic pole surface 125A and the fifth magnetic pole surface 125E, and a guided end on the side opposite to the fixed end, and the guided end is held between the first armature portion 110A and the second armature portion 110B, that is, between the first coil 111A and the fifth coil 111E in the example shown in FIG. 10, to be guided in the linear motion. The second guide target member 132B has a fixed end to be fixed to an outer corner of the plurality of second cores 122B, that is, a boundary part between the second magnetic pole surface 125B and the sixth magnetic pole surface 125F, and a guided end on the side opposite to the fixed end, and the guided end is held between the second armature portion 110B and the fourth armature portion 110D, that is, between the second coil 111B and the sixth coil 111F in the example shown in FIG. 10, to be guided in the linear motion. The third guide target member 132C has a fixed end to be fixed to an outer corner of the plurality of third cores 122C, that is, a boundary part between the third magnetic pole surface 125C and the seventh magnetic pole surface 125G, and a guided end on the side opposite to the fixed end, and the guided end is held between the third armature portion 110C and the first armature portion 110A, that is, between the third coil 111C and the seventh coil 111G in the example shown in FIG. 10, to be guided in the linear motion. The fourth guide target member 132D has a fixed end to be fixed to an outer corner of the plurality of fourth cores 122D, that is, a boundary part between the fourth magnetic pole surface 125D and the eighth magnetic pole surface 125H, and a guided end on the side opposite to the fixed end, and the guided end is held between the fourth armature portion 110D and the third armature portion 110C, that is, between the fourth coil 111D and the eighth coil 111H in the example shown in FIG. 10, to be guided in the linear motion.

The first to fourth guide target members 132A to 132D allow the dead space between adjacent armature portions out of the first to fourth armature portions 110A to 110D to be utilized as a space for guiding the magnetic pole element 120.

Figure 11:
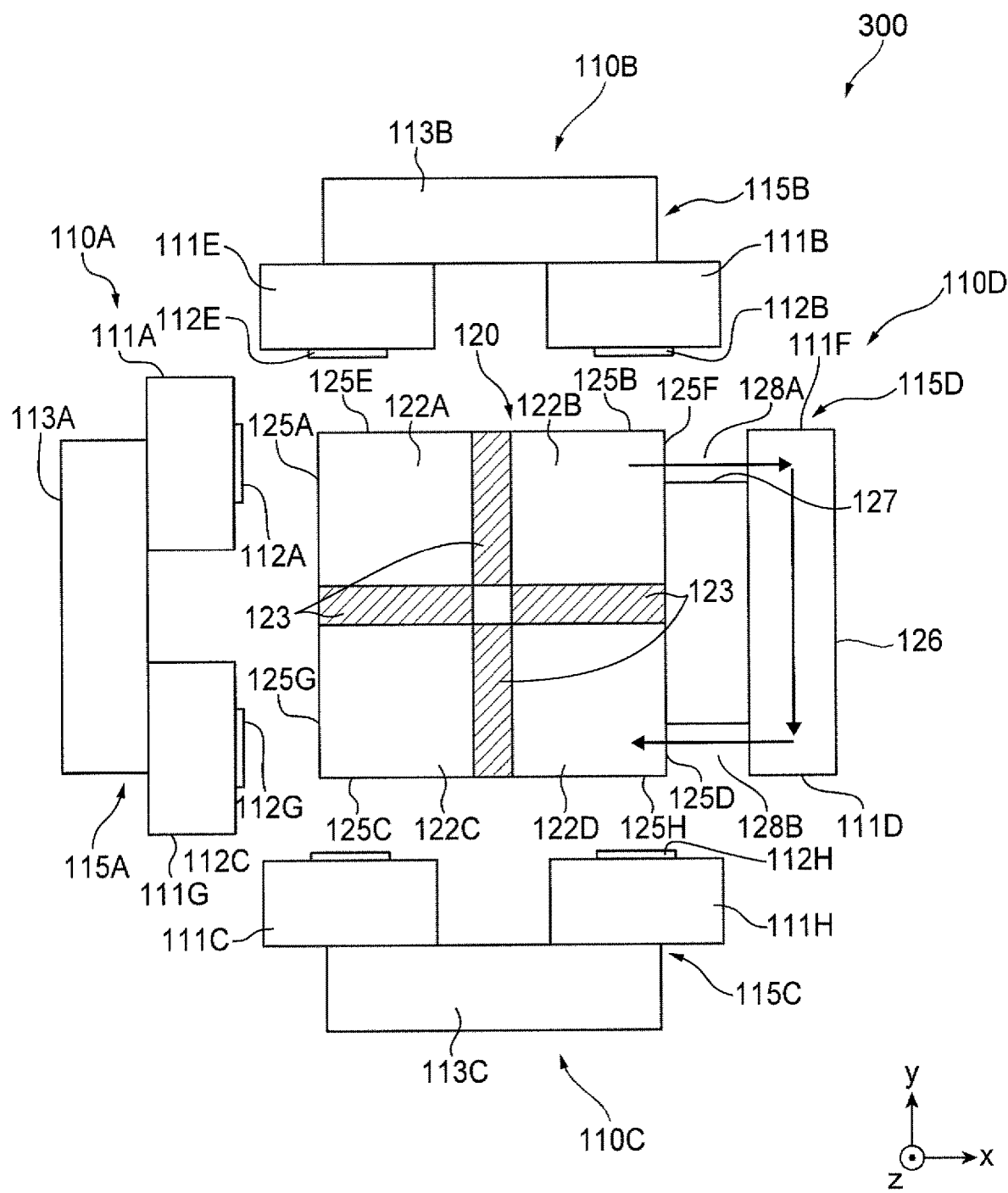
FIG. 11 is a front view of a linear motor according to a third embodiment of the present invention.

FIG. 11 is a front view of a linear motor 300 according to a third embodiment of the present invention. The linear motor 300 includes a magnetic pole element 120, a first armature portion 110A, a second armature portion 110B and a third armature portion 110C, that are equivalent to the magnetic pole element 120, the first armature portion 110A, the second armature portion 110B, and the third armature portion 110C included in the linear motor 100 according to the first embodiment, respectively, but includes no armature portion corresponding to the fourth armature portion 110D. This allows the maintenance for the magnetic pole element 120 and other (for example, attachment and detachment of the plurality of restraint members) to be easily performed on the side opposite to the first armature portion 110A (right side in FIG. 11).

The magnetic pole element 120 of the linear motor 300 includes a magnetic-pole-element back yoke 126 and a spacer 127 as an alternative to the fourth armature portion 110D. The magnetic-pole-element back yoke 126 is formed of a magnetic material, and disposed so as to be opposed to respective sixth magnetic pole surfaces 125D of the fourth cores 122D and respective sixth magnetic pole surfaces 125F of the plurality of second cores 122B in the magnetic pole element 120 with a gap in the first alignment direction (x-direction: horizontally in FIG. 11). The spacer 127 is formed of a non-magnetic material and interposed between the magnetic-pole-element back yoke 126 and respective fourth magnetic pole surfaces 125D of the fourth cores 122D and to interconnect the magnetic-pole-element back yoke 126 and the fourth and sixth cores 122D and 122F.

The spacer 127 is disposed so as to fill the gap except for a pair of magnetic path gaps 128A and 128B to leave the pair of magnetic path gaps 128A and 128B. The pair of magnetic path gaps 128A and 128B are located on both outer sides (upper side and lower side in FIG. 11) of the spacer 127 with respect to the second alignment direction (y-direction in FIG. 11), respectively, and allow a magnetic path to be formed in each of the pair of magnetic path gaps 128A and 128B between the magnetic-pole-element back yoke 126 and the fourth magnetic pole surface 125D and the sixth magnetic pole surface 125F.

The dimension of the spacer 127 in the first alignment direction (the left-right direction in FIG. 11), that is, the thickness dimension, is set to a dimension that allows, as indicated by arrows in FIG. 11, a magnetic path circulating between the plurality of second cores 122B and fourth cores 122D and the magnetic-pole-element back yoke 126 through the pair of magnetic path gaps 128A and 128B to be formed. Specifically, gap dimensions are set to be equal to each other, the gap dimensions including: a first gap dimension that is the dimension of the gap between the plurality of first magnetic pole surfaces 125A and the plurality of first coil cores 112A; a second gap dimension that is the dimension of the gap between the plurality of second magnetic pole surfaces 125B and the plurality of second coil cores 112B; a third gap dimension that is the dimension of the gap between the plurality of third magnetic pole surfaces 125C and the plurality of third coil cores 112C; a fourth gap dimension that is the dimension of the gap between the plurality of fourth magnetic pole surfaces 125D and the plurality of fourth coil cores 112D; a fifth gap dimension that is the dimension of the gap between the plurality of fifth magnetic pole surfaces 125E and the plurality of fifth coil cores 112E; the dimension of the gap between the plurality of sixth magnetic pole surfaces 125F and the plurality of sixth coil cores 112F; the seventh gap dimension that is the dimension of the gap between the plurality of seventh magnetic pole surfaces 125G and the plurality of seventh coil cores 112G; and the eighth gap dimension that is the dimension of the gap between the plurality of eighth magnetic pole surfaces 125H and the plurality of eighth coil cores 112H, and the dimension of the spacer 127 in the first alignment direction, that is, the thickness dimension, is set to be enough equivalent to each of the first to eighth gap dimensions to allow the magnetic path magnetic path circulating between the plurality of second cores 122B and fourth cores 122D and the magnetic-pole-element back yoke 126 through the pair of magnetic path gaps 128A and 128B to be formed.

Figure 12:
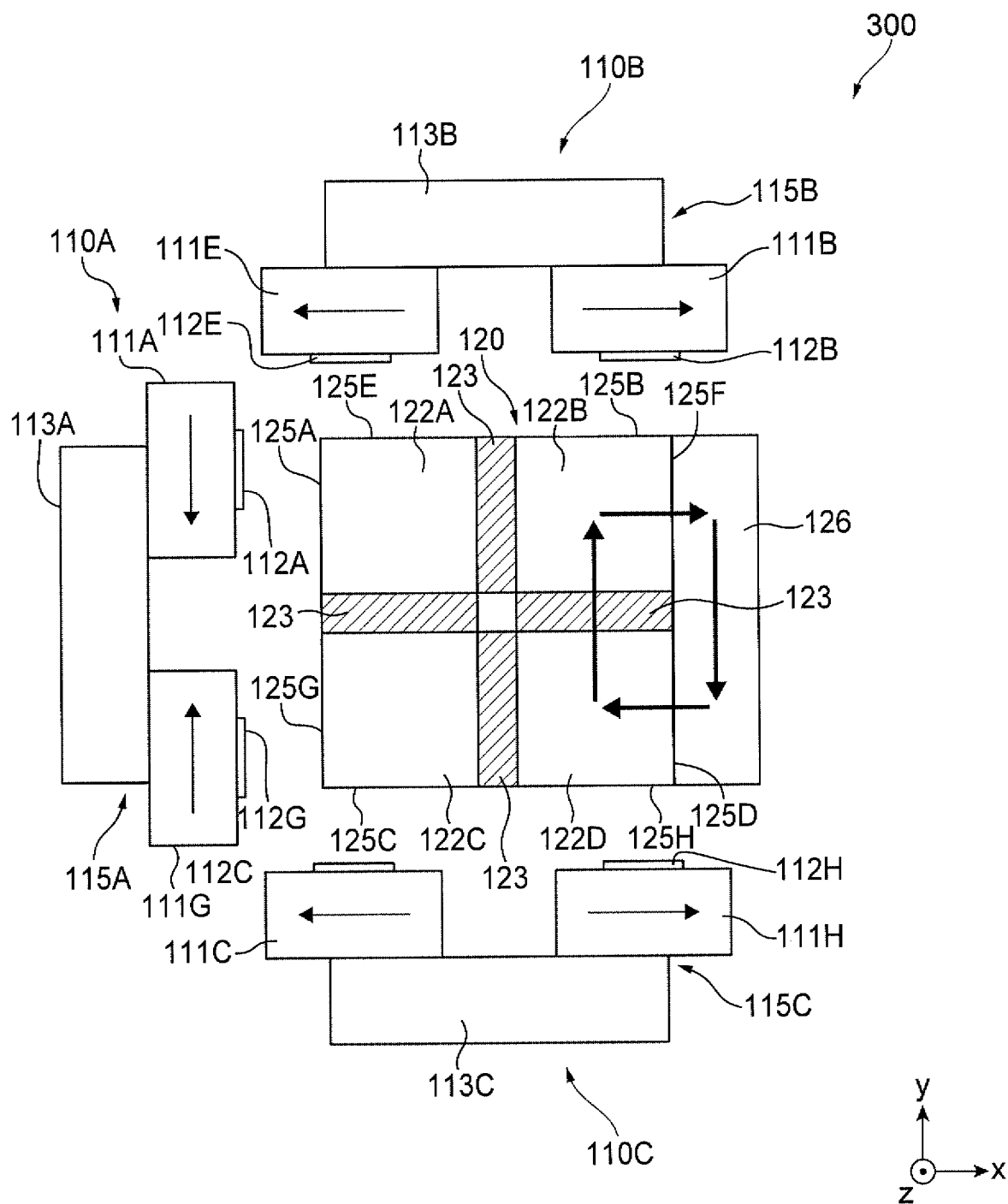
FIG. 12 is a front view showing a magnetic path generated in the case of absence of the spacer in the linear motor according to the third embodiment.

If the thickness dimension of the spacer 127 is smaller than each of the first to eighth gap dimensions by an amount exceeding a fixed limit or the spacer 127 is absent, it would cause the magnetic path to be short-circuited to thereby hinder the magnetic flux from passing through a gap or the permanent magnet 123 through which the magnetic flux should pass. For example, as shown in FIG. 12, if the linear motor 300 includes none of the spacer 127 to allow the magnetic-pole-element back yoke 126 to be in direct contact with the fourth and sixth magnetic pole surfaces 125D and 125F, could be formed only a magnetic path as indicated by an arrow in FIG. 12, that is, a magnetic path that passes through the magnetic-pole-element back yoke 126 but remains in the magnetic pole element 120. The magnetic flux according to the magnetic path cannot be interlinked with the current loop formed by the second armature portion 110B, thus having no contribution to the driving of the magnetic pole element 120.

Figure 13:
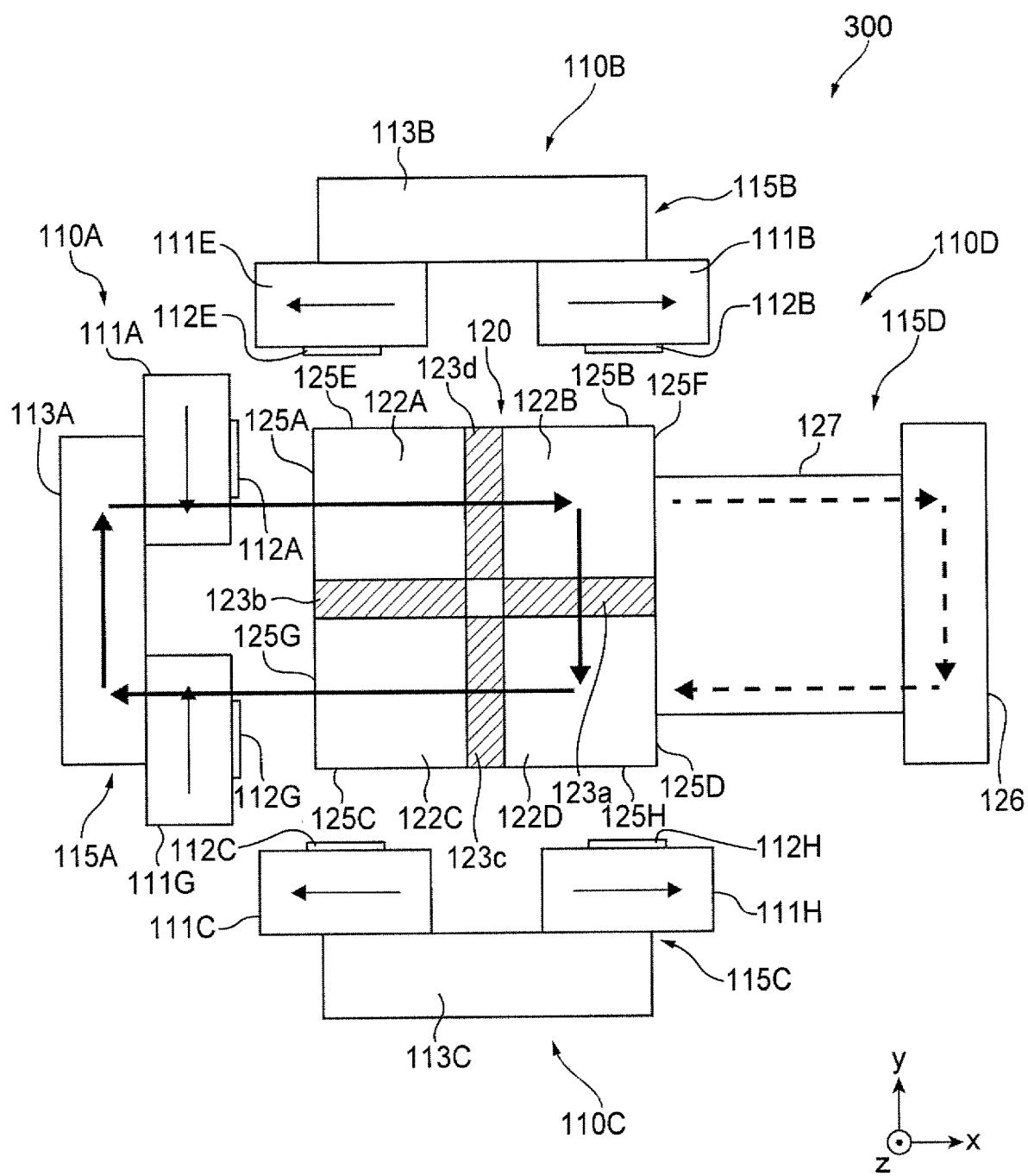
FIG. 13 is a front view showing a magnetic path generated in the case where the dimension of the spacer in a first alignment direction in the linear motor according to the third embodiment is larger than the dimension of a gap between a plurality of armature portions and a magnetic pole element by a fixed amount or more.

If the thickness dimension of the spacer 127 is, conversely, as shown in FIG. 13, larger than each of the first to eighth gap dimensions by an amount exceeding a fixed limit, no magnetic path would be generated in the magnetic-pole-element back yoke 126, but rather, a main magnetic path is generated in a direction to cancel the magnetic flux generated by the permanent magnet 123. Specifically, the excessive thickness dimension of the spacer 127 hinders a magnetic path that should be formed so as to pass through the magnetic-pole-element back yoke 126 as indicated by a dashed arrow in FIG. 13 from being generated and causes, in place thereof, such a main magnetic flux as to cross the permanent magnet 123a interposed between the third and fourth cores 122C and 122D out of the four permanent magnets 123 a, 123b, 123c, and 123d shown in FIG. 13 to be formed. The main magnetic flux cancels the other magnetic flux generated in the magnetic pole element 120, thereby reducing the amount of magnetic flux between the magnetic pole element 120 and the second armature portion 110B, that is, the amount of magnetic flux contributing to the driving of the magnetic pole element 120.

Also to the linear motor 300 according to the present embodiment, the plurality of restraint members according to the second embodiment are applicable.

As already described, a linear motor is provided, being capable of having enhanced thrust density. Provided is a linear motor including a magnetic pole element and an armature. The armature generates a magnetic field that moves the magnetic pole element in a linear motion direction relatively to the armature. The magnetic pole element includes a plurality of cores, each of which is formed of a magnetic material and has a plurality of magnetic pole surfaces opposable to the armature, and a plurality of permanent magnets interposed between adjacent cores that are adjacent to each other among the plurality of cores. The plurality of cores include a plurality of first cores aligned in the linear motion direction, a plurality of second cores aligned in the linear motion direction, a plurality of third cores aligned in the linear motion direction, and a plurality of fourth cores aligned in the linear motion direction. The first cores are adjacent to the second cores, respectively, in a first alignment direction orthogonal to the linear motion direction and adjacent to the third cores, respectively, in a second alignment direction orthogonal to each of the linear motion direction and the first alignment direction. The fourth cores are adjacent to the second cores, respectively, in the second alignment direction and adjacent to the third cores, respectively, in the first alignment direction. The plurality of magnetic pole surfaces of each of the first cores include a first magnetic pole surface facing a side opposite to the plurality of second cores in the first alignment direction and a fifth magnetic pole surface facing a side opposite to the plurality of third cores in the second alignment direction. The plurality of magnetic pole surfaces of each of the second cores include a second magnetic pole surface facing a side opposite to the plurality of fourth cores in the second alignment direction and a sixth magnetic pole surface facing a side opposite to the plurality of first cores in the first alignment direction. The plurality of magnetic pole surfaces of each of the third cores include a third magnetic pole surface facing a side opposite to the plurality of first cores in the second alignment direction and a seventh magnetic pole surface facing a side opposite to the plurality of fourth cores in the first alignment direction. The plurality of magnetic pole surfaces of each of the fourth cores include a fourth magnetic pole surface facing a side opposite to the plurality of third cores in the first alignment direction and an eighth magnetic pole surface facing a side opposite to the plurality of second cores in the second alignment direction. The plurality of permanent magnets are interposed between adjacent cores that are adjacent to each other among the plurality of cores, respectively. Each of the permanent magnets has a first magnet surface opposed to one of the adjacent cores and a second magnet surface facing a side opposite to the first magnet surface, the first magnet surface and the second magnet surface forming mutually opposite magnetic poles. The plurality of permanent magnets are arranged such that the magnetic pole surfaces that are adjacent to each other and included in a magnetic pole surface group constituted by the plurality of magnetic pole surfaces of the plurality of cores form mutually opposite magnetic poles. The armature is divided into a plurality of armature portions spaced in a direction orthogonal to the linear motion direction, and the plurality of armature portions include a first armature portion, a second armature portion, and a third armature portion. The first armature portion includes: a plurality of first coil cores aligned in the linear motion direction so as to be opposable to the first magnetic pole surface of each of the first cores in the first alignment direction, each of the first coil cores being formed of a magnetic material; a plurality of seventh coil cores aligned in the linear motion direction so as to be opposable to the seventh magnetic pole surface of each of the third cores in the first alignment direction, each of the seventh coil cores being formed of a magnetic material; a plurality of first coils disposed around the plurality of first coil cores, respectively, to form a magnetic flux flowing between each of the first coil cores and the first magnetic pole surface; a plurality of seventh coils disposed around the plurality of seventh coil cores, respectively, to form a magnetic flux flowing between each of the seventh coil cores and the seventh magnetic pole surface; and a first back yoke formed of a magnetic material and interconnecting the plurality of first coil cores and the plurality of seventh coil cores so as to allow a magnetic flux to flow between the plurality of first coil cores and the plurality of seventh coil cores. The second armature portion includes: a plurality of second coil cores aligned in the linear motion direction so as to be opposable to the second magnetic pole surface of each of the second cores in the second alignment direction, each of the second coil cores being formed of a magnetic material; a plurality of fifth coil cores aligned in the linear motion direction so as to be opposable to the fifth magnetic pole surface of each of the first cores in the second alignment direction, each of the fifth coil cores being formed of a magnetic material; a plurality of second coils disposed around the plurality of second coil cores, respectively, to form a magnetic flux flowing between each of the second coil cores and the second magnetic pole surface; a plurality of fifth coils disposed around the plurality of fifth coil cores, respectively, to form a magnetic flux flowing between each of the fifth coil cores and the fifth magnetic pole surface; and a second back yoke formed of a magnetic material and interconnecting the plurality of second coil cores and the plurality of fifth coil cores so as to allow a magnetic flux to flow between the plurality of second coil cores and the plurality of fifth coil cores. The third armature portion includes: a plurality of third coil cores aligned in the linear motion direction so as to be opposable to the third magnetic pole surface of each of the third cores in the second alignment direction, each of the third coil cores being formed of a magnetic material; a plurality of eighth coil cores aligned in the linear motion direction so as to be opposable to the eighth magnetic pole surface of each of the fourth cores in the second alignment direction, each of the eighth coil cores being formed of a magnetic material; a plurality of third coils disposed around the plurality of third coil cores, respectively, to form a magnetic flux flowing between each of the third coil cores and the third magnetic pole surface; a plurality of eighth coils disposed around the plurality of eighth coil cores, respectively, to form a magnetic flux flowing between each of the eighth coil cores and the eighth magnetic pole surface; and a third back yoke formed of a magnetic material and interconnecting the plurality of third coil cores and the plurality of eighth coil cores to each other so as to allow a magnetic flux to flow between the plurality of third coil cores and the plurality of eighth coil cores.

In the above linear motor, where the plurality of first to eighth magnetic pole surfaces are formed by the plurality of first to fourth cores and the plurality of permanent magnets in the magnetic pole element while the armature is divided into a plurality of armature portions to be efficiently opposed to an appropriate magnetic pole surface among the plurality of first to eighth magnetic pole surfaces, it is possible to restrain a leakage magnetic field and to increase a magnetic flux contributing to driving of the magnetic pole element.

Preferably, the plurality of armature portions further include a fourth armature portion disposed so as to be separated from the first armature portion, the second armature portion, and the third armature portion in a direction orthogonal to the linear motion direction. The fourth armature portion includes: a plurality of fourth coil cores aligned in the linear motion direction so as to be opposable to the fourth magnetic pole surface of each of the fourth cores in the first alignment direction, each of the fourth coil cores being formed of a magnetic material; a plurality of sixth coil cores aligned in the linear motion direction so as to be opposable to the sixth magnetic pole surface of each of the second cores in the first alignment direction, each of the sixth coil cores being formed of a magnetic material; a plurality of fourth coils disposed around the plurality of fourth coil cores, respectively, to form a magnetic flux flowing between each of the fourth coil cores and the fourth magnetic pole surface; a plurality of sixth coils disposed around the plurality of sixth coil cores, respectively, to form a magnetic flux flowing between each of the sixth coil cores and the sixth magnetic pole surface; and a fourth back yoke formed of a magnetic material and interconnecting the plurality of fourth coil cores and the plurality of sixth coil cores so as to allow a magnetic flux to flow between the plurality of fourth coil cores and the plurality of sixth coil cores. The linear motor, including the fourth armature portion in addition to the first to third armature portions, can generate a larger magnetic flux with higher isotropy.

Alternatively, the magnetic pole element may include a magnetic-pole-element back yoke formed of a magnetic material and disposed so as to be opposed to the fourth magnetic pole surface of each of the fourth cores and the sixth magnetic pole surface of each of the second cores with a gap in the first alignment direction, and a spacer formed of a non-magnetic material and interposed between the magnetic-pole-element back yoke and the fourth magnetic pole surface of each of the fourth cores and the sixth magnetic pole surface of each of the second cores. The spacer is disposed so as to fill the gap except for a pair of magnetic path gaps to leave the pair of magnetic path gaps. The pair of magnetic path gaps are located on both outer sides of the spacer in the second alignment direction, respectively, to allow a magnetic path to be generated between the magnetic-pole-element back yoke and the fourth magnetic pole surface and between the magnetic-pole-element back yoke and the sixth magnetic pole surface, respectively. A dimension of the spacer in the first alignment direction is set to a dimension that allows a magnetic path that circulates between the magnetic-pole-element back yoke and the plurality of second cores and the plurality of fourth cores through the pair of magnetic path gaps to be formed.

The combination of the magnetic-pole-element back yoke and the spacer having an appropriate dimension in the first alignment direction enables a magnetic path that circulates between the plurality of second cores and the plurality of fourth cores and the magnetic-pole-element back yoke through the pair of magnetic path gaps to be formed while omitting the fourth armature portion to facilitate maintenance or the like relating to the magnetic pole element.

Specifically, the dimension of the spacer in the first alignment direction is, preferably, enough equivalent to each of gap dimensions to allow a magnetic path that circulates between the magnetic-pole-element back yoke and the plurality of second cores and the plurality of fourth cores through the pair of magnetic path gaps to be formed, the gap dimensions including a dimension of a gap between the plurality of first magnetic pole surfaces and the plurality of first coil cores, a dimension of a gap between the plurality of second magnetic pole surfaces and the plurality of second coil cores, a dimension of a gap between the plurality of third magnetic pole surfaces and the plurality of third coil cores, a dimension of a gap between the plurality of fourth magnetic pole surfaces and the plurality of fourth coil cores, a dimension of a gap between the plurality of fifth magnetic pole surfaces and the plurality of fifth coil cores, a dimension of a gap between the plurality of sixth magnetic pole surfaces and the plurality of sixth coil cores, a dimension of a gap between the plurality of seventh magnetic pole surfaces and the plurality of seventh coil cores, and a dimension of a gap between the plurality of eighth magnetic pole surfaces and the plurality of eighth coil cores.

Preferably, the linear motor further includes a plurality of restraint members that are disposed around the magnetic pole element and restrain the magnetic pole element from relative movement to the armature in a direction other than the linear motion direction. The plurality of restraint members can stabilize the direction of the relative movement of the magnetic pole elements to the plurality of armature portions in spite of the dispersive arrangement of the plurality of armature portions.

Specifically, it is preferable that the plurality of restraint members include a restraint member that is interposed between at least one selected back yoke that is selected from the plurality of armature portions and the magnetic pole element to restrain the magnetic pole element from approaching the at least one selected back yoke. Interposed between the at least one back yoke and the magnetic pole element, the restraint member can reliably keep the gap between the armature portion and the magnetic pole element while allowing a magnetic path to be generated between the magnetic pole element and the armature portion in which the back yoke is included.

The plurality of restraint members, alternatively, may include at least one guide target member. The at least one guide target member is fixed to the magnetic pole element and interposed between adjacent armature portions that are adjacent to each other among the plurality of armature portions to be thereby guided in the linear motion direction by the adjacent armature portions. This makes it possible to stabilize the direction of the relative movement of the magnetic pole elements to the plurality of armature portions by effective utilization of the space between the adjacent armature portions.

The invention claimed is:

1. A linear motor comprising:
   a magnetic pole element and;
   an armature that generates a magnetic field that moves the magnetic pole element in a linear motion direction relatively to the armature, wherein:
   the magnetic pole element includes a plurality of cores, each of which is formed of a magnetic material and has a plurality of magnetic pole surfaces opposable to the armature, and a plurality of permanent magnets interposed between adjacent cores that are adjacent to each other among the plurality of cores;
   the plurality of cores include a plurality of first cores aligned in the linear motion direction, a plurality of second cores aligned in the linear motion direction, a plurality of third cores aligned in the linear motion direction, and a plurality of fourth cores aligned in the linear motion direction;
   the first cores are adjacent to the second cores, respectively, in a first alignment direction orthogonal to the linear motion direction and adjacent to the third cores, respectively, in a second alignment direction orthogonal to each of the linear motion direction and the first alignment direction;
   the fourth cores are adjacent to the second cores, respectively, in the second alignment direction and adjacent to the third cores, respectively, in the first alignment direction;
   the plurality of magnetic pole surfaces of each of the first cores include a first magnetic pole surface facing a side opposite to the plurality of second cores in the first alignment direction and a fifth magnetic pole surface facing a side opposite to the plurality of third cores in the second alignment direction, the first magnetic pole surface facing in a first facing direction parallel to the first alignment direction, the fifth magnetic pole surface facing in a fifth direction which is parallel to the second alignment direction and orthogonal to the first facing direction, the first magnetic pole surface and the fifth magnetic pole surface being adjacent to each other so as to make the first facing direction and the fifth facing direction orthogonal to each other;

the plurality of magnetic pole surfaces of each of the second cores include a second magnetic pole surface facing a side opposite to the plurality of fourth cores in the second alignment direction and a sixth magnetic pole surface facing a side opposite to the plurality of first cores in the first alignment direction, the second magnetic pole surface facing in a second facing direction parallel to the second alignment direction, the sixth magnetic pole surface facing in a sixth direction which is parallel to the first alignment direction and orthogonal to the second facing direction, the second magnetic pole surface and the sixth magnetic pole surface being adjacent to each other so as to make the second facing direction and the sixth facing direction orthogonal to each other;

the plurality of magnetic pole surfaces of each of the third cores include a third magnetic pole surface facing a side opposite to the plurality of first cores in the second alignment direction and a seventh magnetic pole surface facing a side opposite to the plurality of fourth cores in the first alignment direction, the third magnetic pole surface facing in a third facing direction parallel to the second alignment direction, the seventh magnetic pole surface facing in a seventh direction which is parallel to the first alignment direction and orthogonal to the third facing direction, the third magnetic pole surface and the seventh magnetic pole surface being adjacent to each other so as to make the third facing direction and the seventh facing direction orthogonal to each other;

the plurality of magnetic pole surfaces of each of the fourth cores include a fourth magnetic pole surface facing a side opposite to the plurality of third cores in the first alignment direction and an eighth magnetic pole surface facing a side opposite to the plurality of second cores in the second alignment direction, the fourth magnetic pole surface facing in a fourth facing direction parallel to the first alignment direction, the eighth magnetic pole surface facing in a eighth direction which is parallel to the second alignment direction and orthogonal to the fourth facing direction, the fourth magnetic pole surface and the eighth magnetic pole surface being adjacent to each other so as to make the fourth facing direction and the eighth facing direction orthogonal to each other;

the plurality of permanent magnets are interposed between adjacent cores that are adjacent to each other among the plurality of cores, respectively, each of the permanent magnets having a first magnet surface opposed to one of the adjacent cores and a second magnet surface facing a side opposite to the first magnet surface, the first magnet surface and the second magnet surface forming mutually opposite magnetic poles, and the plurality of permanent magnets are arranged such that the magnetic pole surfaces that are adjacent to each other and included in a magnetic pole surface group constituted by the plurality of magnetic pole surfaces of the plurality of cores form mutually opposite magnetic poles;

the armature is divided into a plurality of armature portions spaced in a direction orthogonal to the linear motion direction, the plurality of armature portions including a first armature portion, a second armature portion, a third armature portion, and a fourth armature portion;

the first armature portion includes: a plurality of first coil cores aligned in the linear motion direction so as to face the first magnetic pole surface of each of the first cores in the first facing direction, each of the first coil cores being formed of a magnetic material; a plurality of seventh coil cores aligned in the linear motion direction so as to face the seventh magnetic pole surface of each of the third cores in the seventh facing direction, each of the seventh coil cores being formed of a magnetic material; a plurality of first coils disposed around the plurality of first coil cores, respectively, to form a magnetic flux flowing between each of the first coil cores and the first magnetic pole surface facing each other in the first facing direction; a plurality of seventh coils disposed around the plurality of seventh coil cores, respectively, to form a magnetic flux flowing between each of the seventh coil cores and the seventh magnetic pole surface facing each other in the seventh facing direction; and a first back yoke formed of a magnetic material and interconnecting the plurality of first coil cores and the plurality of seventh coil cores so as to allow a magnetic flux to flow between the plurality of first coil cores and the plurality of seventh coil cores;

the second armature portion includes: a plurality of second coil cores aligned in the linear motion direction so as to face the second magnetic pole surface of each of the second cores in the second facing direction, each of the second coil cores being formed of a magnetic material; a plurality of fifth coil cores aligned in the linear motion direction so as to face the fifth magnetic pole surface of each of the first cores in the fifth facing direction, each of the fifth coil cores being formed of a magnetic material; a plurality of second coils disposed around the plurality of second coil cores, respectively, to form a magnetic flux flowing between each of the second coil cores and the second magnetic pole surface facing each other in the second facing direction; a plurality of fifth coils disposed around the plurality of fifth coil cores, respectively, to form a magnetic flux flowing between each of the fifth coil cores and the fifth magnetic pole surface facing each other in the fifth facing direction; and a second back yoke formed of a magnetic material and interconnecting the plurality of second coil cores and the plurality of fifth coil cores so as to allow a magnetic flux to flow between the plurality of second coil cores and the plurality of fifth coil cores; and the third armature portion includes: a plurality of third coil cores aligned in the linear motion direction so as to face the third magnetic pole surface of each of the third cores in the third facing direction, each of the third coil cores being formed of a magnetic material; a plurality of eighth coil cores aligned in the linear motion direction so as to face the eighth magnetic pole surface of each of the fourth cores in the eighth facing direction, each of the eighth coil cores being formed of a magnetic material; a plurality of third coils disposed around the plurality of third coil cores, respectively, to form a magnetic flux flowing between each of the third coil cores and the third magnetic pole surface facing each other in the third facing direction; a plurality of eighth coils disposed around the plurality of eighth coil cores, respectively, to form a magnetic flux flowing between each of the eighth coil cores and the eighth magnetic pole surface facing each other in the eighth facing direction; and a third back yoke formed of a magnetic material and interconnecting the plurality of third coil cores and the plurality of eighth coil cores to each other so as to allow a magnetic flux to flow between the plurality of third coil cores and the plurality of eighth coil cores, the fourth armature portion includes: a plurality of fourth coil cores aligned in the linear motion direction so as to face the fourth magnetic pole surface of each of the fourth cores in the fourth facing direction, each of the fourth coil cores being formed of a magnetic material; a plurality of sixth coil cores aligned in the linear motion direction so as to face the sixth magnetic pole surface of each of the second cores in the sixth facing direction, each of the sixth coil cores being formed of a magnetic material; a plurality of fourth coils disposed around the plurality of fourth coil cores, respectively, to form a magnetic flux flowing between each of the fourth coil cores and the fourth magnetic pole surface facing each other in the fourth facing direction; a plurality of sixth coils disposed around the plurality of sixth coil cores, respectively, to form a magnetic flux flowing between each of the sixth coil cores and the sixth magnetic pole surface facing each other in the sixth facing direction; and a fourth back yoke formed of a magnetic material and interconnecting the plurality of fourth coil cores and the plurality of sixth coil cores so as to allow a magnetic flux to flow between the plurality of fourth coil cores and the plurality of sixth coil cores.

2. The linear motor according to claim 1, further comprising a plurality of restraint members that are disposed around the magnetic pole element and restrain the magnetic pole element from relative movement to the armature in a direction other than the linear motion direction.

3. The linear motor according to claim 2, wherein the plurality of restraint members include a restraint member that is interposed between at least one selected back yoke that is selected from the plurality of armature portions and the magnetic pole element to restrain the magnetic pole element from approaching the at least one selected back yoke.

4. A linear motor comprising:
a magnetic pole element, and
an armature that generates a magnetic field that moves the magnetic pole element in a linear motion direction relatively to the armature, wherein:
the magnetic pole element includes a plurality of cores, each of which is formed of a magnetic material and has a plurality of magnetic pole surfaces opposable to the armature, and a plurality of permanent magnets interposed between adjacent cores that are adjacent to each other among the plurality of cores;
the plurality of cores include a plurality of first cores aligned in the linear motion direction, a plurality of second cores aligned in the linear motion direction, a plurality of third cores aligned in the linear motion direction, and a plurality of fourth cores aligned in the linear motion direction;
the first cores are adjacent to the second cores, respectively, in a first alignment direction orthogonal to the linear motion direction and adjacent to the third cores, respectively, in a second alignment direction orthogonal to each of the linear motion direction and the first alignment direction;

the fourth cores are adjacent to the second cores, respectively, in the second alignment direction and adjacent to the third cores, respectively, in the first alignment direction;

the plurality of magnetic pole surfaces of each of the first cores include a first magnetic pole surface facing a side opposite to the plurality of second cores in the first alignment direction and a fifth magnetic pole surface facing a side opposite to the plurality of third cores in the second alignment direction;

the plurality of magnetic pole surfaces of each of the second cores include a second magnetic pole surface facing a side opposite to the plurality of fourth cores in the second alignment direction and a sixth magnetic pole surface facing a side opposite to the plurality of first cores in the first alignment direction;

the plurality of magnetic pole surfaces of each of the third cores include a third magnetic pole surface facing a side opposite to the plurality of first cores in the second alignment direction and a seventh magnetic pole surface facing a side opposite to the plurality of fourth cores in the first alignment direction;

the plurality of magnetic pole surfaces of each of the fourth cores include a fourth magnetic pole surface facing a side opposite to the plurality of third cores in the first alignment direction and an eighth magnetic pole surface facing a side opposite to the plurality of second cores in the second alignment direction;

the plurality of permanent magnets are interposed between adjacent cores that are adjacent to each other among the plurality of cores, respectively, each of the permanent magnets having a first magnet surface opposed to one of the adjacent cores and a second magnet surface facing a side opposite to the first magnet surface, the first magnet surface and the second magnet surface forming mutually opposite magnetic poles, and the plurality of permanent magnets are arranged such that the magnetic pole surfaces that are adjacent to each other and included in a magnetic pole surface group constituted by the plurality of magnetic pole surfaces of the plurality of cores form mutually opposite magnetic poles;

the armature is divided into a plurality of armature portions spaced in a direction orthogonal to the linear motion direction, the plurality of armature portions including a first armature portion, a second armature portion, and a third armature portion;

the first armature portion includes: a plurality of first coil cores aligned in the linear motion direction so as to be opposable to the first magnetic pole surface of each of the first cores in the first alignment direction, each of the first coil cores being formed of a magnetic material; a plurality of seventh coil cores aligned in the linear motion direction so as to be opposable to the seventh magnetic pole surface of each of the third cores in the first alignment direction, each of the seventh coil cores being formed of a magnetic material; a plurality of first coils disposed around the plurality of first coil cores, respectively, to form a magnetic flux flowing between each of the first coil cores and the first magnetic pole surface; a plurality of seventh coils disposed around the plurality of seventh coil cores, respectively, to form a magnetic flux flowing between each of the seventh coil cores and the seventh magnetic pole surface; and a first back yoke formed of a magnetic material and interconnecting the plurality of first coil cores and the plurality of seventh coil cores so as to allow a magnetic flux to flow between the plurality of first coil cores and the plurality of seventh coil cores;

the second armature portion includes: a plurality of second coil cores aligned in the linear motion direction so as to be opposable to the second magnetic pole surface of each of the second cores in the second alignment direction, each of the second coil cores being formed of a magnetic material; a plurality of fifth coil cores aligned in the linear motion direction so as to be opposable to the fifth magnetic pole surface of each of the first cores in the second alignment direction, each of the fifth coil cores being formed of a magnetic material; a plurality of second coils disposed around the plurality of second coil cores, respectively, to form a magnetic flux flowing between each of the second coil cores and the second magnetic pole surface; a plurality of fifth coils disposed around the plurality of fifth coil cores, respectively, to form a magnetic flux flowing between each of the fifth coil cores and the fifth magnetic pole surface; and a second back yoke formed of a magnetic material and interconnecting the plurality of second coil cores and the plurality of fifth coil cores so as to allow a magnetic flux to flow between the plurality of second coil cores and the plurality of fifth coil cores; and the third armature portion includes: a plurality of third coil cores aligned in the linear motion direction so as to be opposable to the third magnetic pole surface of each of the third cores in the second alignment direction, each of the third coil cores being formed of a magnetic material; a plurality of eighth coil cores aligned in the linear motion direction so as to be opposable to the eighth magnetic pole surface of each of the fourth cores in the second alignment direction, each of the eighth coil cores being formed of a magnetic material; a plurality of third coils disposed around the plurality of third coil cores, respectively, to form a magnetic flux flowing between each of the third coil cores and the third magnetic pole surface; a plurality of eighth coils disposed around the plurality of eighth coil cores, respectively, to form a magnetic flux flowing between each of the eighth coil cores and the eighth magnetic pole surface; and a third back yoke formed of a magnetic material and interconnecting the plurality of third coil cores and the plurality of eighth coil cores to each other so as to allow a magnetic flux to flow between the plurality of third coil cores and the plurality of eighth coil cores, wherein the magnetic pole element includes a magnetic-pole-element back yoke formed of a magnetic material and disposed so as to be opposed to the fourth magnetic pole surface of each of the fourth cores and the sixth magnetic pole surface of each of the second cores with a gap in the first alignment direction, and a spacer formed of a non-magnetic material and interposed between the magnetic-pole-element back yoke and the fourth magnetic pole surface of each of the fourth cores and the sixth magnetic pole surface of each of the second cores; the spacer is disposed so as to fill the gap except for a pair of magnetic path gaps to leave the pair of magnetic path gaps, the pair of magnetic path gaps being located on both outer sides of the spacer in the second alignment direction, respectively, to allow a magnetic path to be generated between the magnetic-pole-element back yoke and the fourth magnetic pole surface and between the magnetic-pole-element back yoke and the sixth magnetic pole surface, respectively; and a dimension of the spacer in the first alignment direction is set to a dimension that allows a magnetic path that circulates between the magnetic-pole-element back yoke and the plurality of second cores and the plurality of fourth cores through the pair of magnetic path gaps to be formed.

5. The linear motor according to claim 4, wherein the dimension of the spacer in the first alignment direction is enough equivalent to each of gap dimensions to allow a magnetic path that circulates between the magnetic-pole-element back yoke and the plurality of second cores and the plurality of fourth cores through the pair of magnetic path gaps to be formed, the gap dimensions including a dimension of a gap between the plurality of first magnetic pole surfaces and the plurality of first coil cores, a dimension of a gap between the plurality of second magnetic pole surfaces and the plurality of second coil cores, a dimension of a gap between the plurality of third magnetic pole surfaces and the plurality of third coil cores, a dimension of a gap between the plurality of fourth magnetic pole surfaces and the plurality of fourth coil cores, a dimension of a gap between the plurality of fifth magnetic pole surfaces and the plurality of fifth coil cores, a dimension of a gap between the plurality of sixth magnetic pole surfaces and the plurality of sixth coil cores, a dimension of a gap between the plurality of seventh magnetic pole surfaces and the plurality of seventh coil cores, and a dimension of a gap between the plurality of eighth magnetic pole surfaces and the plurality of eighth coil cores.

6. The linear motor according to claim 4, further comprising a plurality of restraint members that are disposed around the magnetic pole element and restrain the magnetic pole element from relative movement to the armature in a direction other than the linear motion direction.

7. The linear motor according to claim 6, wherein the plurality of restraint members includes a restraint member that is interposed between at least one selected back yoke that is selected from the plurality of armature portions and the magnetic pole element to restrain the magnetic pole element from approaching the at least one selected back yoke.

8. The linear motor according to claim 6 wherein the plurality of restraint members includes at least one guide target member, which is fixed to the magnetic pole element and interposed between adjacent armature portions that are adjacent to each other among the plurality of armature portions to be thereby guided in the linear motion direction by the adjacent armature portions.

9. A linear motor comprising:
a magnetic pole element, and
an armature that generates a magnetic field that moves the magnetic pole element in a linear motion direction relatively to the armature, wherein:
the magnetic pole element includes a plurality of cores, each of which is formed of a magnetic material and has a plurality of magnetic pole surfaces opposable to the armature, and a plurality of permanent magnets interposed between adjacent cores that are adjacent to each other among the plurality of cores;
the plurality of cores include a plurality of first cores aligned in the linear motion direction, a plurality of second cores aligned in the linear motion direction, a plurality of third cores aligned in the linear motion direction, and a plurality of fourth cores aligned in the linear motion direction;

the first cores are adjacent to the second cores, respectively, in a first alignment direction orthogonal to the linear motion direction and adjacent to the third cores, respectively, in a second alignment direction orthogonal to each of the linear motion direction and the first alignment direction;

the fourth cores are adjacent to the second cores, respectively, in the second alignment direction and adjacent to the third cores, respectively, in the first alignment direction;

the plurality of magnetic pole surfaces of each of the first cores include a first magnetic pole surface facing a side opposite to the plurality of second cores in the first alignment direction and a fifth magnetic pole surface facing a side opposite to the plurality of third cores in the second alignment direction;

the plurality of magnetic pole surfaces of each of the second cores include a second magnetic pole surface facing a side opposite to the plurality of fourth cores in the second alignment direction and a sixth magnetic pole surface facing a side opposite to the plurality of first cores in the first alignment direction;

the plurality of magnetic pole surfaces of each of the third cores include a third magnetic pole surface facing a side opposite to the plurality of first cores in the second alignment direction and a seventh magnetic pole surface facing a side opposite to the plurality of fourth cores in the first alignment direction;

the plurality of magnetic pole surfaces of each of the fourth cores include a fourth magnetic pole surface facing a side opposite to the plurality of third cores in the first alignment direction and an eighth magnetic pole surface facing a side opposite to the plurality of second cores in the second alignment direction;

the plurality of permanent magnets are interposed between adjacent cores that are adjacent to each other among the plurality of cores, respectively, each of the permanent magnets having a first magnet surface opposed to one of the adjacent cores and a second magnet surface facing a side opposite to the first magnet surface, the first magnet surface and the second magnet surface forming mutually opposite magnetic poles, and the plurality of permanent magnets are arranged such that the magnetic pole surfaces that are adjacent to each other and included in a magnetic pole surface group constituted by the plurality of magnetic pole surfaces of the plurality of cores form mutually opposite magnetic poles;

the armature is divided into a plurality of armature portions spaced in a direction orthogonal to the linear motion direction, the plurality of armature portions including a first armature portion, a second armature portion, and a third armature portion;

the first armature portion includes: a plurality of first coil cores aligned in the linear motion direction so as to be opposable to the first magnetic pole surface of each of the first cores in the first alignment direction, each of the first coil cores being formed of a magnetic material; a plurality of seventh coil cores aligned in the linear motion direction so as to be opposable to the seventh magnetic pole surface of each of the third cores in the first alignment direction, each of the seventh coil cores being formed of a magnetic material; a plurality of first coils disposed around the plurality of first coil cores, respectively, to form a magnetic flux flowing between each of the first coil cores and the first magnetic pole surface; a plurality of seventh coils disposed around the plurality of seventh coil cores, respectively, to form a magnetic flux flowing between each of the seventh coil cores and the seventh magnetic pole surface; and a first back yoke formed of a magnetic material and interconnecting the plurality of first coil cores and the plurality of seventh coil cores so as to allow a magnetic flux to flow between the plurality of first coil cores and the plurality of seventh coil cores;

the second armature portion includes: a plurality of second coil cores aligned in the linear motion direction so as to be opposable to the second magnetic pole surface of each of the second cores in the second alignment direction, each of the second coil cores being formed of a magnetic material; a plurality of fifth coil cores aligned in the linear motion direction so as to be opposable to the fifth magnetic pole surface of each of the first cores in the second alignment direction, each of the fifth coil cores being formed of a magnetic material; a plurality of second coils disposed around the plurality of second coil cores, respectively, to form a magnetic flux flowing between each of the second coil cores and the second magnetic pole surface; a plurality of fifth coils disposed around the plurality of fifth coil cores, respectively, to form a magnetic flux flowing between each of the fifth coil cores and the fifth magnetic pole surface; and a second back yoke formed of a magnetic material and interconnecting the plurality of second coil cores and the plurality of fifth coil cores so as to allow a magnetic flux to flow between the plurality of second coil cores and the plurality of fifth coil cores; and the third armature portion includes: a plurality of third coil cores aligned in the linear motion direction so as to be opposable to the third magnetic pole surface of each of the third cores in the second alignment direction, each of the third coil cores being formed of a magnetic material; a plurality of eighth coil cores aligned in the linear motion direction so as to be opposable to the eighth magnetic pole surface of each of the fourth cores in the second alignment direction, each of the eighth coil cores being formed of a magnetic material; a plurality of third coils disposed around the plurality of third coil cores, respectively, to form a magnetic flux flowing between each of the third coil cores and the third magnetic pole surface; a plurality of eighth coils disposed around the plurality of eighth coil cores, respectively, to form a magnetic flux flowing between each of the eighth coil cores and the eighth magnetic pole surface; and a third back yoke formed of a magnetic material and interconnecting the plurality of third coil cores and the plurality of eighth coil cores to each other so as to allow a magnetic flux to flow between the plurality of third coil cores and the plurality of eighth coil cores, wherein the linear motor further comprises a plurality of restraint members that are disposed around the magnetic pole element and restrain the magnetic pole element from relative movement to the armature in a direction other than the linear motion direction, and the plurality of restraint members includes at least one guide target member, which is fixed to the magnetic pole element and interposed between adjacent armature portions that are adjacent to each other among the plurality of armature portions to be thereby guided in the linear motion direction by the adjacent armature portions.

* * * * *